United States Patent [19]

Kuehnle

[11] 4,363,711

[45] Dec. 14, 1982

[54] METHOD OF MAKING PHOTOCONDUCTIVE COATING

[75] Inventor: Manfred R. Kuehnle, Lexington, Mass.

[73] Assignee: Coulter Systems Corporation, Bedford, Mass.

[21] Appl. No.: 142,145

[22] Filed: Apr. 21, 1980

Related U.S. Application Data

[60] Division of Ser. No. 798,876, May 20, 1977, Pat. No. 4,269,919, which is a continuation-in-part of Ser. No. 704,780, Jul. 13, 1976, Pat. No. 4,025,339, and a continuation of Ser. No. 434,699, Jan. 18, 1974, abandoned, and a continuation-in-part of Ser. No. 378,180 Jul. 11, 1973 abandoned, and a continuation-in-part of Ser. No. 323,132, Jan. 12, 1973, abandoned, and a continuation-in-part of Ser. No. 260,848, Jun. 8, 1972, abandoned.

[51] Int. Cl.³ .......... B23C 15/00

[52] U.S. Cl. .......... 204/192 P; 204/192 S; 430/128; 430/133

[58] Field of Search .......... 204/192 S, 192 P; 430/128, 133

[56] References Cited

U.S. PATENT DOCUMENTS

| | | | |
|---|---|---|---|
| 2,769,778 | 11/1956 | Preston | 204/192 P |
| 4,025,339 | 5/1977 | Kuehnle | 204/192 S |
| 4,033,843 | 7/1977 | Krikorian | 204/192 P |

*Primary Examiner*—Veronica O'Keefe

*Attorney, Agent, or Firm*—Silverman, Cass & Singer, Ltd.

[57] ABSTRACT

A method of making a photoconductive coating of the type which comprises a crystalline layer of wholly inorganic material on a suitable substrate for use as an electrophotographic member, said method including the steps of depositing the coating in a vacuum chamber by sputtering with R.F. energy in such a manner that the deposit is crystalline, with the individual crystals oriented substantially vertically, the size of the crystals being uniform and hexagonal in configuration and of the order of 700 to 800 Angstroms in diameter and with a barrier layer coating on the surface that is of extreme resistivity, each crystal acting independently as an independent field domain, the crystal length normal to the substrate being the same as the coating thickness and the deposit evidencing single crystal configuration in response to diffraction pattern measurements. Background gas, including minute measured quantities of oxygen, being introduced during the sputtering and permitted to react with the surface of the sputtered coating.

15 Claims, 10 Drawing Figures

METHOD OF MAKING PHOTOCONDUCTIVE COATING

CROSS REFERENCES TO RELATED APPLICATIONS

This is a Division, of application Ser. No. 798,876 filed May 20, 1977 now U.S. Pat. No. 4,269,919, which is a continuation-in-part of the following five applications, being directly linked to the chain through the last-filed of these cases, all but said last two filed being abandoned:

1. Pending application Ser. No. 704,780 filed July 13, 1976 now U.S. Pat. No. 4,025,339 granted May 24, 1977, entitled "ELECTROPHOTOGRAPHIC FILM, METHOD OF MAKING SAME AND PHOTOCONDUCTIVE COATING USED THEREWITH", filed as a continution application of then pending
2. Application Ser. No. 434,699 filed Jan. 18, 1974 entitled "ELECTROPHOTOGRAPHIC FILM, METHOD OF MAKING AND USING THE SAME AND PHOTOCONDUCTIVE COATING USED THEREWITH" which was filed as a continuation-in-part of then pending
3. Application Ser. No. 378,180 filed July 11, 1973 entitled "ELECTROPHOTOGRAPHIC FILM, METHOD OF MAKING AND USING THE SAME AND PHOTOCONDUCTIVE COATING USED THEREWITH" which was filed as a continuation-in-part of then pending
4. Application Ser. No. 323,132 filed Jan. 12, 1973 entitled "ELECTROPHOTOGRAPHIC FILM AND METHOD OF MAKING AND USING THE SAME", which was filed as a continuation-in-part of then pending
5. Application Ser. No. 260,848 filed June 8, 1972 entitled "ELECTROPHOTOGRAPHIC FILM."

All the above are owned by the same assignee.

BACKGROUND OF THE INVENTION

The field of the invention comprises photoconductive materials and principally their application to recording and imaging. More specifically the invention is concerned with a novel method of depositing a photoconductive coating that has a wide range of uses because of its ability to function as means for storing and selectively giving up electrical charge.

One very important use of photoconductive materials is in the art of electrophotography where electrostatic images are made and developed. The field of electrophotographic members and their construction and use is also involved herein.

The background of the invention is, by reason of the wide utility of the coating thereof, concerned with work that has been carried out in many disciplines. The most familiar of these is the art of electrostatics where an electrophotographic member is charged uniformly in darkness, exposed by projecting light from an object onto the charged member to dissipate or discharge the electrical charge selectively, developed by applying charged particles to the resulting latent electrostatic image of the object and further processed. The further processing is for the purpose of preserving the developed image of the object, either by transfer of the developed image to a carrier or by fixing the developed image directly onto the electrophotographic member.

Both of the processes described above are well known respectively as xerography and electrofax, and the art on the subject is voluminous and need not be detailed. The basic techniques, that is, charging, exposing, developing and further processing are capable of being performed with electrophotographic members of the invention having as a part thereof the coating of the invention. The electrophotographic member of the invention differs from known electrophotographic members primarily in that its composition is different and its performance is vastly superior to that of known electrophotographic members.

The electrophotographic member of the invention, among its other attributes differs from the prior art by reason of its high speed, high field strength, high gain, ability to achieve infinite grey scale, absence of residual charge upon discharge, absence of fatigue, low cost, durability, high resolution and panchromaticity. When deposited on a polyester or other stable plastic sheeting substrate it is highly flexible and transparent to a degree that images formed thereon can be projected.

Treated in the same manner as photographic film, that is, using the same conditions of light and exposure the electrophotographic film of the invention is superior to photographic film because it is archival in nature, has higher resolution, images can be added to it, and the film can be reused if not processed after development. It is made out of easily obtained materials in ambient light and can be handled and stored without the precautions required for silver halide film. It is made without using the scarce metal, silver, in its manufacture.

The invention is also useful for almost any field that a photoconductive material can be used, and is advantageous because of its high quantum gain which is greater than unity, its anisotropy, its flexibility (when deposited on a flexible substrate), its transparency.

The principal material from which the photoconductive coating of the invention is made is cadmium sulfide, deposited in a sputtering process using R.F. energy. Cadmium sulfide has been known as a photoconductive material for many years and there is a vast body of literature which is concerned with work done on this and similar materials. So far as known, no prior art teachings have succeeded in achieving the coating of the invention with all of its advantages and benefits, as detailed in the specification. Further, no use has been made, so far as known, of a coating of the properties of the invention in an electrophotographic member.

Some of the prior art photoconductive coatings which are used especially in electrophotography are selenium, zinc oxide and polyvinyl carbasol. Selenium is used in an amorphous form, is soft and easily abraded. It requires high voltages for charging and when changed provides surface voltages that are of the order of 600 volts, that is, about twenty times those which are achieved on the surface of the coating of the electrophotographic member of the invention. Notwithstanding this, the field strength represented by volts per centimeter of thickness is substantially less than those achieved by the invention. Selenium has a noise voltage which is higher than the surface potential of the charged coating of the invention. It has a residual charge, it fatigues, it is slow because its gain is very low. Zinc oxide is used in a binder matrix. It is applied to a paper which is conductive and also has low speed. It is soft, incapable of being imaged with high resolution images, is practically opaque when used. Polyvinyl carbasol is an organic material subject to all of the vagaries of organic compounds, is slow and unstable, soft, not transparent, has limited spectral response, etc.

SUMMARY OF THE INVENTION

The method of the invention involves the making of a photoconductive coating on a suitable substrate as a wholly inorganic sputtered deposit on some form of substrate and having the following physical, electrical and chemical properties:

1. Microcrystalline, with the crystals having hexagonal morphology and great uniformity commensurate with a single crystal deposit, a diameter of the order of 700 to 800 Angstroms, a length which can range from about 1,000 Angstroms upward to about 10,000 Angstroms for best results, being oriented substantially vertically with respect to the substrate and having near perfect stoichiometry.
2. Transparent to a degree that 70% to 85% of visible light will pass in the preferred form, i.e. deposited on a transparent substrate.
3. An electrical configuration that provides a deep trap surface layer (see 6 below) which captures electrons when charged, a depletion layer extending throughout the entire remaining bulk of the coating, a transit time for electron movement which is substantially less than the electron lifetime thereby sustaining the electric field during carrier travel, and a zone of positive energy states (immobile holes) near the deep trap layer which promotes secondary collisions and additional electrons during discharge.
4. Panchromatic, so far as cadmium sulfide is concerned if charged, over the visible range to a degree greater than unsensitized photographic film or any known electrophotographic material due to the creation of traps in the inner crystalline structure. Other materials have excellent spectral response with some wave lengths emphasized depending on the particular compound.
5. Having a quantum efficiency greater than unity for most of the visible spectrum readily amplified by doping.
6. Having a barrier layer on its surface that provides a lateral surface resistivity of the order of $10^{20}$ ohms per square due to orientation of molecules during deposit with the sulfur atom outward available for combination with background gas to form oxygen-carrying compounds. This barrier layer has deep traps in the sense that when charged there are negative surface states strongly bound and not readily freed. Thus the barrier layer is negative in character; the bulk of the coating below this is positive since it has been depleted of negative carriers, the degree of depletion being least immediately above the ohmic layer, hence less positive here. The thicker the coating, the less positive the layer immediately above the ohmic layer.
7. Inert to humidity, normal temperature variations, and most radiation; almost perfectly dense; highly abrasion-resistant; glass hard and unusually smooth surfaced.
8. N-type semiconductor material but resulting in an NPN configuration (see 3 above), electrically anisotropic, capable of accepting and sustaining a rapid charge at a tonable level to achieve a toned resolution of 1000 line pairs (cycles) per millimeter.
9. Having a dark resistivity when charged of the order of $10^{14}$ ohm centimeters and a ratio of dark to light resistivity at least of the order of $10^6$ but with substantially no change in surface resistivity whether charged or not and whether in light or not, thereby providing the electronic anisotropy referred to in 8 above.
10. Capable of total discharge with practically no residual charge; no persistent photoconductivity; no fatigue; no edge effect, no reciprocity failure.

The electrophotographic member resulting from the method according to the invention comprises a coating of preferably cadmium sulfide as described above on a layer of ohmic material such as tin-indium oxide of the order of about 100 to 500 Angstroms thick, these being in turn deposited preferably on a polyester or other stable plastic sheeting substrate that is clear and of the order of a fraction of a millimeter thick, preferably with an intervening bonding layer of the same material as the coating between the ohmic layer and substrate of the order of 30 Angstroms or less thick. In the preferred form it is cadmium sulfide. This electrophotographic member has the following properties, in addition to those which were mentioned above the the coating:

1. Flexible enough to be capable of being rolled to a diameter of less than ½" without cracking or flaking.
2. Transparent to the same degree as the coating mentioned above.
3. Capable of being used in transfer processes or by having a toned image fixed to its surface and projected.
4. Capable of being made in practically unlimited lengths with a width limited by the size of the sputtering machine. Typically, rolls of about 20 to 30 inches can be coated in a continuous process.

For certain purposes, sacrificing some advantages, coatings as thin as 1,000 Angstroms can be used for copying with extremely brilliant light and long toning times.

The method of depositing the cadmium sulfide or other material according to the invention comprises the following steps or processes carried out under the conditions which are described:

1. The deposit is made in a continuous process by having a rolled supply of substrate and a take-up device within the low pressure vessel so that the substrate is continuously moving and is heated, softened and slightly shrunk simultaneously with coating but without fracturing thus obviating wrinkles.
2. The gas mixture in the vacuum chamber during sputtering is argon to furnish the bombarding ions, hydrogen sulfide to keep the stoichiometry of the deposit correct, and a minute amount of oxygen to control and promote the presence of the barrier layer on the surface of the deposit.
3. Sputtering is carried out using R.F. energy, the anode comprising a not at ground potential drum over which the substrate passes, the drum having shielding, the target being pure cadmium sulfide or the other materials mentioned herein, the target comprising the cathode, the shielding in all cases being at ground potential and the cathode being maintained at a substantial voltage below ground.
4. The anode is maintained at a voltage that is slightly below ground so that in effect there is a bias of a negative voltage between the anode and ground. The bias is not less than about negative ten volts and not required to be more than about negative 50 volts. The voltage of the cathode with respect to ground on a typical installation is of the order of negative 1800 to 2000 volts d.c., the d.c. occurring due to diode action.

5. With the above-described conditions, there is a second dark space between the sputtered plasma and the anode in engagement with which the substrate passes while the sputtering occurs, this being in addition to the first dark space at the cathode, the latter being known as Crooke's dark space and the second dark space being identified in literature as Langmuir sheath.

The prior art of electrophotographic members revolves primarily around the two principal techniques of electrofax and xerography. In both cases, the quality, resolution and reproduction faithfulness suffer to some extent because of the physical nature of the coatings, the substrates upon which they are deposited and the carriers for transfer, for example, of the images. These deficiencies are in addition to those which are inherent in the nature of the coating.

In the case of quality and resolution, apart from the electrical aspects, the surfaces of known photoconductive coatings are relatively rough, granular, pitted, etc. This can readily be seen by comparing the surfaces of coatings of the invention with the surfaces of zinc oxide and selenium members for example under microscopes. The coating of the invention has a surface which is only capable of being seen as composed of crystallites when viewed under an electron microscope. The irregularities of coatings of the prior art are represented by microscopic pits, hills, grain, etc. hundreds, and more usually, thousands of times larger than the smallest incremental protrusion of the coating of the invention.

Toner particles are as a general rule almost perfectly spherical and are of the order of several microns in diameter. When fused onto a perfectly planar surface the toner particle can melt into a perfect disc or run together as smooth surfaced patches to make a perfect dot. This is what happens on the surface of the coating of the invention. When fused onto the prior art surfaces, or transferred to a rough surface and fused, the toner particle melts down to a ragged or amorphous spot. Perfectly formed dots and smooth surfaced patches give better images than amorphous dots or clumps.

Substrates of plastic sheet are not inherently dimensionally stable because they sag, stretch, distort etc. under conditions straining them or changing their temperature and moisture conditions. Accordingly, anything which is to be accurately imaged or reproduced would not be expected to maintain accuracy. A belt of electrophotographic material or a member which is subjected to strain would be expected to distort. In the case of the invention, since the sputtering is occurring while the substrate is shrinking, the resulting crystalline deposit is under compressive stress and has great strength and integrity. Accordingly, it is dimensionally stable, even under conditions of moisture, heat, and attempted strain.

DESCRIPTION OF THE PREFERRED EMBODIMENTS

This invention is directed to an electrophotographic coating which is photoconductive in nature and is useful for any of the applications for photoconductive materials in addition to electrophotographic members.

Figure 1:
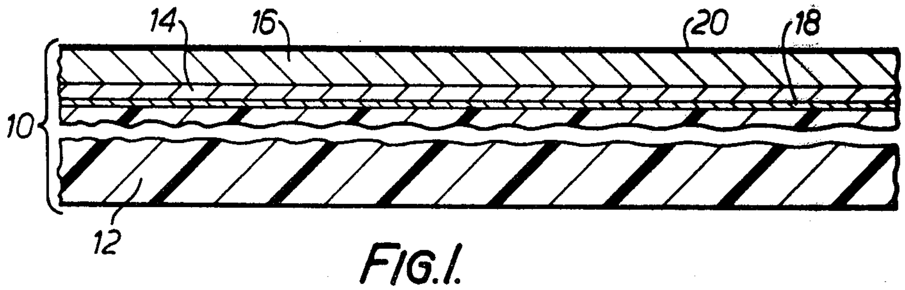
FIG. 1 is a fragmentary sectional view through an electrophotographic member constructed in accordance with the invention, using the coating of the invention.

FIG. 1 shows, in exaggerated dimensions, an electrophotographic member which has the coating of the invention. The entire electrophotographic member is designated 10 and it is made up of three basic parts, the substrate 12, the ohmic layer 14 and the photoconductive coating 16. The substrate is preferably polyester film which is clear and has a thickness of about 0.005". This material is an organic polymer of good quality, uniform thickness, smooth-surfaced material of commercial grade. One example is "MYLAR" (E. I. DuPont de Nemours Company). The ohmic layer 14 is a deposit intended to be conductive, preferably made by the same process of sputtering as the coating 16 and even in the identical type of machine (to be described). The preferred layer 14 is formed of a purity grade of semiconductor indium oxide, either alone, or combined with a small percentage of pure tin oxide. The general ratio is about nine to one. Its thickness is from about 100 Angstroms to about 300 Angstroms. The coating 16 is pure or doped cadmium sulfide (CdS) which is sputtered onto the ohmic layer 14 in a thickness which preferably will range from about 2000 Angstroms to 6500 Angstroms. Certain deposits may be less than 2000 Angstroms and as much as 2 microns. As will be seen from the graph of FIG. 7, the properties vary to a certain extent for different thicknesses. This will also be explained below.

Two other layers or coatings are shown in FIG. 1, these being a bonding layer 18 and a surface barrier layer 20. The bonding layer 18 is for the purpose of ensuring the adherence of the ohmic layer 14 to the surface of the substrate 12 and it is conveniently a very thin layer of cadmium sulfide that is sputtered onto the substrate. The thickness of this layer is not readily measured, even by interferometric techniques. It is estimated that the layer ranges from 10 to 50 Angstroms. The layer 18 is applied by operating the sputtering machine in the same mode as used to deposit the photoconductive coating 16 but in applying the bonding layer 18 the machine is operated at a higher speed so that there is a "breath" of deposit. The deposit is so thin and transparent that it cannot readily be seen. Electrophotographic members 10 can be made without this layer 18, but variation of the many parameters involved during the sputtering process will often give rise to some non-uniformities which may render the adherence of the ohmic layer 14 to the substrate 12 unreliable in areas. The bonding layer 18 provides reliable adherence for commercial production.

The barrier layer 20 is also so thin that its thickness is not readily ascertainable. Its composition is also not fully known or understood, but its presence has been proven by the removal thereof through ion bombardment experiments. The thickness is estimated as 20 to 50 Angstroms. Its composition is believed to be an oxide of sulfur possibly in a form combined with cadmium in the case of cadmium sulfide.

It is believed that in the deposit of the coating 16, the uppermost atom is sulfur which more readily combines with oxygen if the latter is available at least towards the completion of deposit.

Figure 2:
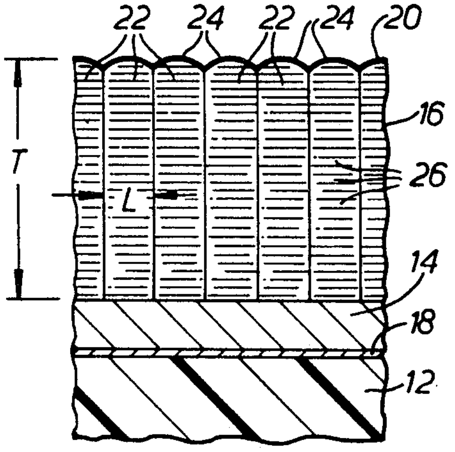
FIG. 2 is a fragmentary sectional view on an enlarged scale showing the theoretical microscopic structure of the electrophotographic member of FIG. 1.

FIG. 2 is an exaggerated fragmentary sectional view through the coating 16 and the ohmic layer 14 to show the structure of the several layers and coatings. The structure which is illustrated is based upon both direct and indirect measurements and tests made on the electrophotographic member 10. It responds to the theory of operation which will be explained hereinafter.

The substrate 12, bonding layer 18 and ohmic layer 14 are shown diagrammatically. The coating 16 is shown as made up of crystallites or microscopic crystals 22 that have a vertical dimension T (transverse) that is the same as the thickness of the coating and hence is of the order of 3500 Angstroms for a typical preferred coating. The crystals are hexagonal, as has been ascertained from crystallographic studies, and have a diameter L (lateral) which is of the order of 700 to 800 Angstroms. They are closely packed, according to crystallographic parlance, and they are oriented vertically as ascertained by X-ray diffraction measurements. The exposed tips of the crystallites are rounded as shown at 24 and these provide a smooth, hard, glass-like surface that is abrasion resistant to a very substantial degree compared with known electrophotographic members. Attempts made to abrade the surface using sharp instruments show that it acts like glass in resisting such attempts, while zinc oxide and selenium members readily scratch. The tips are microscopic and, related to the size of particles of toner, the surface may be considered exceedingly smooth. The area of a crystal tip would be one thirtieth that of a toner particle that is 2 microns in diameter.

Each of the tips 24 is believed to act as though it had an electric field independent of all others when the coating 16 is charged, thereby obviating migration of charge between increments of the surface. This will be explained hereinafter in connection with the theory of operation.

The crystallites are made up of platelets or tiny blocks 26 that are roughly 65 Angstroms thick so that there will be a stacking of about 50 or so platelets in each crystallite with slight irregularities in such stacking. This, it is believed, establishes many depletion conditions in the bulk that increase the panchromaticity.

The barrier layer 20 provides extremely high surface resistance so that charge will not migrate laterally on the surface, which, in combination with the action as independent fields by the crystallite tips gives exceptional resolution. The layer 20 has high energy surface states when the coating is charged. Its effect is so dominant that intercrystalline boundaries or interfaces are of no consequence in the electrical characteristics of the film. Specifically these boundaries or interfaces do not function as effective barrier layers between crystals.

Figure 3:
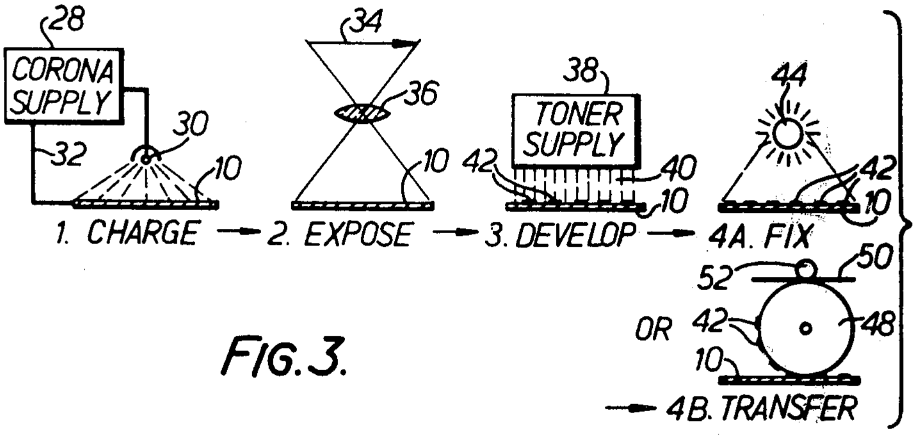
FIG. 3 is a diagrammatic view showing the several steps which are followed in the use of the electrophotographic member of FIG. 1.

In FIG. 3 there is illustrated, starting from left to right the various steps which are followed in using the electrophotographic member for imaging. In the left hand diagram identified as Step No. 1, a source of corona 28 is connected to a corona wire 30 from which negative ions are applied to the surface of the member 10 to charge the same, raising its surface potential to about 30 or 40 volts. The ohmic layer 18 is connected to the corona supply by the conductor 32 in any suitable manner, either directly or by means of a contact of some type. This step is effected in darkness. Corona supply 28 will apply a voltage of 5000 to 7000 volts d.c. across the air between the wire 30 and the member 10.

As a result of the charging step, the surface 20 of the electrophotographic member 10 is uniformly charged with a negative charge that reaches a value of about 30 to 50 volts d.c. These negative charges are entrapped below the outer plane of the coating within the barrier layer. The charges are strongly bound with energy states not readily disrupted. Thus, it has been found that the surface can be touched by neutral members such as paper or mechanical rollers and will not lose its charge. The bulk plus the ohmic layer contain the same number of charges of opposite polarity.

Assuming a charge of 30 volts on the surface and a thickness of 3000 Angstroms for convenience, it can be seen that the field strength through the material resulting from the charge is about 1,000,000 volts per centimeter. This may be compared, for example, to the charge on selenium which, for a thickness of 60 microns assumes a surface voltage of about 600 volts, which represents a field strength of about 10,000 volts per centimeter.

The second step illustrated in FIG. 3 as Step No. 2 is called "Expose". In this part of the process, the electrophotographic member 10 having been uniformly charged in darkness, it is immediately thereafter exposed to a light projected object. In FIG. 3 the object is represented at 34 and is assumed to be illuminated by a suitable source of light (not shown). The object is projected by means of a suitable optical system, represented symbolically at 36, onto the charged surface. The uniform surface charge previously applied is selectively dissipated in proportion to the degree of illumination of the projected image. This results in a selective discharge and produces a duplicate latent image on the electrophotographic member 10 where the increments which were in the darkest areas of the projected image discharge the least, and the increments which were in the brightest areas of the projected image discharge the most. Due to illumination energy, electrons can recombine with holes from the bulk.

Now that the latent image of charge has been formed, the next step in the process is called "Develop" and this is designated as Step No. 3 in FIG. 3. In the electrostatic apparatus as known at this time, development is effected by means of the application of charged particles to the latent image. These particles are charged by triboelectric effect or electrophoretically. Assuming, for example, that the latent image on the electrophotographic member 10 is negative where dark areas were included and less negative where the lighter areas are, if the particles which are applied are positive, they will tend to adhere to the negatively charged increments and not to adhere to those which are not charged. In this way, a visible image can be achieved.

In FIG. 3, there is shown a block 38 marked "Toner Supply" and the toner particles are shown dropping down at 40 onto the surface of the member 10 and accumulating selectively as indicated at 42. Toner is made of finely divided carbon, resin and the like. It is applied as a dry powder or in some cases in an insulative hydrocarbon solvent. There are many different forms of apparatus for applying it, and no particular structure is intended to be represented by the block 38.

After the toner has been applied and the latent image has been rendered visible, that is, developed, it is further processed in either one of two ways. These are shown in FIG. 3 at Step 4A and Step 4B which are alternates. In Step 4A the developed image is subjected to a source of heat such as the flash of a heat lamp 44 which fuses the particles to the electrophotographic member 10 permanently. It is assumed that after Step No. 3 the excess toner particles have been brushed off or run off with solvent. In an electrophotographic member which has been processed by fixing the toner to its surface, the member is normally not intended to be used again. In the case of the invention, additional images can be superimposed on the toned image by repeating the charge, expose and tone steps. In the case of the electrofax method where the electrophotographic member is a sheet of conductive paper having a coating of zinc oxide in a resin matrix, the member is removed from the imaging machine as the finished article. The article is opaque to a substantial degree depending upon the opacity of the paper and coating. In the case of the electrophotographic member of the invention, the fixing of the developed image results in a transparency that can be projected, assuming that the substrate 12 is a sheet of clear plastic such as polyester, which is preferred.

Before the fixing Step 4A of FIG. 3, if desired, the visible image represented by the accumulated toner areas 42 can be wiped off the surface of the electrophotographic member 10 of the invention mechanically. The member 10 can then be reused. Even if the image has been fixed as in Step 4A, it can be put through Steps 1, 2 and 3 and additional images added to that already fixed in place as explained above.

In FIG. 3 at Step 4B, an alternative step of further processing is illustrated. Here the unfixed visible image is transferred, either to a carrier such as a sheet of paper by pressing the surface to the sheet of paper, or to an intermediate medium. In FIG. 3 the latter arrangement is shown. The roller 48 could be a pick-up roller, much in the style of the blanket roller of an offset press. The imaged areas 42 are now shown carried on the roller 48 and being transferred to a sheet of paper 50 held to the surface by a pressure roll 52.

The steps of exposing and developing can be effected quite rapidly by electronic means without the use of toner.

Figure 4:
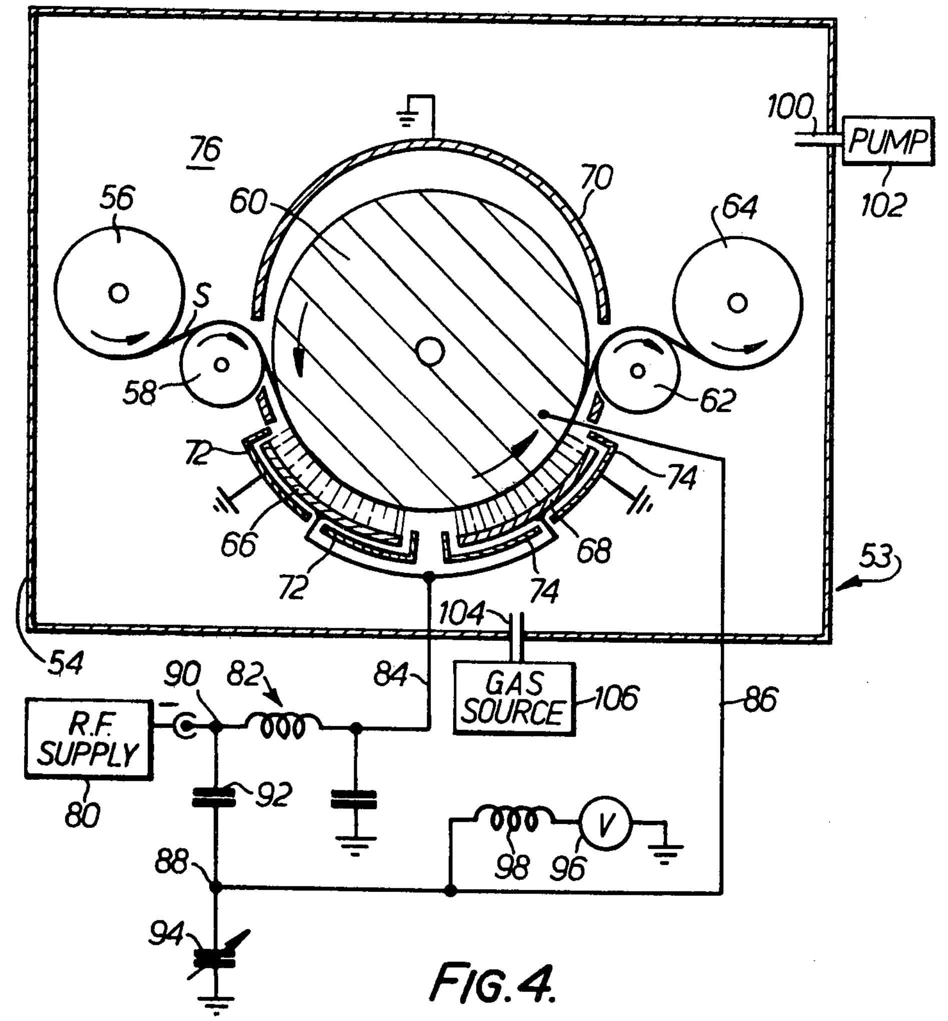
FIG. 4 is a diagram in highly simplified form showing the system of the sputtering apparatus used to practice the method of the invention.

In FIG. 4 there is illustrated in diagrammatic form the apparatus 53 by means of which the method used of applying the coating 16, and preferably the layer 14 is practiced. As explained, the bonding layer 18 is also laid down by the same apparatus and method.

The box 54 of apparatus 53 represents a suitable low pressure vessel of the type which is used for sputtering and the like processes. The mechanical and electrical connections are not shown in this view but those skilled in the art will understand the nature thereof from the description which follows. Mounted on the interior of the vessel 54 are the following components: a supply roll 56, a guide roller 58, a drum 60, a guide roller 62, a take-up roll 64, a pair of arcuate targets 66 and 68 and shielding members 70, 72 and 74. The number of guide rollers is shown as two at 58 and 62 only for convenience in the explanation, the practical device having other rollers and guides to achieve the desired movement of a web. Driving motors, clutches, speed controls, etc. Are all provided for, suitably coupled to the shafts of the various rollers, drum, rolls, etc. as required. These are not shown, but conveniently would be disposed outside of the vessel 54, for example, behind the rear wall 76 of the vessel.

All of the shielding members are grounded, as indicated. The shielding member 70 shields the drum 60 and will be more complex than shown as mechanically required to prevent deposit on the drum and to control the capacitive coupling between the drum and ground. The shielding members 72 and 74 shield the target from sputtering plasma returning to the sides and rear of the targets 66 and 68.

The apparatus 53 is supplied with R.F. energy at a suitable frequency which is 13.5 megahertz in the U.S. from a supply 80 coupled through a suitable transmission line and matching network 82 to the targets 66 and 68. The electric line to the targets is shown at 84. The drum 60 is coupled by way of the line 86 to the junction point 88 which is in a voltage dividing relationship relative to the capacitances between the high voltage point 90 and ground. There is a capacitor shown at 92 and a variable capacitor shown at 94. The voltage from point 90 to ground will divide in accordance with the capacitive reactance of the capacitors 92 and 94 so that the point 88 will have a portion of the total voltage applied to the drum. This voltage can be indicated by a suitable voltmeter 96 that is connected to the line 86 through an R.F. choke 98.

It will be understood that the circuit described is basic and simplified inasmuch as there are complications which come into play at the frequency involved. Thus, the capacitive reactance caused by the many leakage paths from the target and drum to ground must be taken into consideration in constructing the apparatus and adjusting it for proper operation. The drum leakage capacitance to ground is obviously the equivalent of multiple capacitors parallel with capacitor 94.

The operation of the apparatus 53 is in the mode of a diode, the inter-electrode space being that between the cathode (targets 66 and 68) and the anode (drum 60). electric current in the form of electrons is considered to flow from the cathode to the anode so that the cathode is negative with respect to the anode. The voltage of the cathode will be about 1400 to 2000 volts negative d.c. with respect to ground. The voltage is rectified from R.F. by the plasma 108. The anode will be slightly below ground, that is, negative with respect to ground. This latter d.c. voltage of the drum 60 is called the bias voltage, and it is an important concept in the method of the invention, since it is believed that the presence of the bias is essential in the sputtering of the coating 16.

In the sputtering of the coating 16, assuming that the substrate 12 has been prepared with the bonding coating 18 and the ohmic layer 14, a long length which may be as much as several hundred meters of the prepared substrate S is wound onto a roll and the vessel 54 is opened. The roll of prepared substrate S is placed at 56, threaded around the roller 58, around the bottom of the drum 60, around the roller 62 and connected to the take-up roll 64. The vessel 54 is closed and the interior pumped down by way of the port 100 by means of suitable pumps, designated generally at 102. Thereafter the background gas is introduced through the port 104 from the source 106 and the power is turned on.

Figure 5:
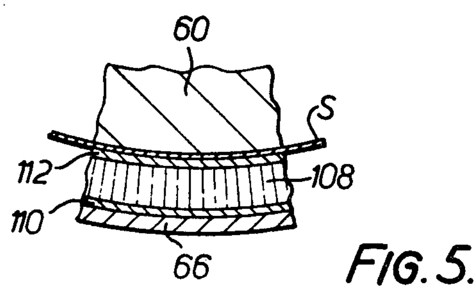
FIG. 5 is an enlarged diagrammatic sectional view showing the general arrangement of the sputtering plasma resulting from the practice of the method of the invention using the system of FIG. 4.

When the conditions are stable, the substrate S will be moving past the targets 66 and 68 at which location there will be a sputtering plasma that deposits the material of the targets onto the exposed surface of the prepared substrate S. In FIG. 5, this arrangement is shown, the interelectrode space 108 being shown occupied by the sputtering plasma. The actual space will be relatively short, of the order of several centimeters at the most. The normal dark space which surrounds the target in sputtering as it is known and is sometimes referred to as Crooke's dark space is shown at 110. Due to the presence of the bias which has been mentioned, there is a second dark space 112 rendered at the anode or drum 60, the substrate S passing the second dark space in direct engagement therewith. The second ark space is known, having been referred to in literature as the Langmuir sheath, but so far as known it has not been used in the controlled manner as disclosed herein for the sputtering of photoconductive material to achieve the properties described.

As indicated, the preferred material of the coating of the invention is cadmium sulfide. When deposited as explained by R.F. sputtering using a bias and the conditions described, this material has the properties detailed below.

1. The coating is wholly inorganic.

The coating 16 is made of cadmium sulfide (CdS) which has been deposited in a thin layer as a pure chemical compound. There are no organic materials used for binding, affecting sensitivity or panchromaticity or for any other purpose. Thus, there is nothing to deteriorate, which gives the coating an indefinite shelf life, being limited only by the archival qualities of the substrate upon which it is deposited.

Cadmium sulfide in its deposited form is not soluble to any extent in water; hence it is impervious to moisture. It is inert to changes in temperature, being unaffected from sub-freezing temperatures to those high temperatures such as 200° Celsius would first melt a polyester substrate upon which it was deposited. It is impervious to fungus.

By reason of the particular method followed in making the deposit, it is produced with near-perfect stoichiometry so that there is no excess of either cadmium or sulfur. This provides stability chemically and physically. It is also believed to enhance the electrical properties as well.

2. The coating is crystalline with microscopic crystallites.

The crystalline nature of the coating has been described in connection with FIG. 2. To repeat, the crystallites are as long as the thickness of the coating of cadmium sulfide, that is, they range from 2000 Angstroms to about 6000 Angstroms in a typical coating; they are hexagonal in their morphology; they are about 700 to 800 Angstroms wide; they are made up of stacks of small platelets about 65 Angstroms thick. They are oriented vertically with respect to the substrate upon which they are deposited and are very uniform in size. In the vernacular of crystallography they are classed as closely packed. Further, they exhibit the orderliness of single crystal configuration when formed as a coating.

3. The coating is dense and abrasion-resistant.

Tests made to ascertain the density of the cadmium sulfide coating indicated that the actual density approaches very closely the calculated theoretical maximum density possible for cadmium sulfide. This is done by removing the coating from sputtered samples, measuring the volume and weighing the same and computing density and thereafter comparing with the theoretical maximum computed from atomic weight. Typical tests showed percentages of maximum ranging from 94 to 99%.

Tests made upon the coating comprised scratch tests using sharp instruments, and comparisons with known electrophotographic members such as selenium and zinc oxide members. The cadmium sulfide deposit resists scratching to a much higher degree than known electrophotographic members.

4. The coating is substantially transparent.

The preferred thickness of the coating is between 2000 and 7000 Angstroms. As seen from the chart of FIG. 7, the transmission of visible light through the coating for these thicknesses varies between 85% and 70%. The considerations are the capture of photons during exposure and the ability to be able to project light through the coating, as when it is to be used to make transparencies or in other applications where light is required to pass through irrespective of the expsoure requirement. In certain applications, thin coatings of the order to 1000 Angstroms can be used, principally for copy work. The coating does not charge as well, requires blue light for exposure and must be toned longer than the preferred coating (2500 to 6500 Angstroms thick). In certain applications where transparency and speed are not important, thicknesses up to 2 microns may be used. The reason for loss of transparency is obvious. The reason for loss of speed in A.S.A. terms is that at thicknesses over about 1.5 microns, the bulk of the coating 16 below the barrier layer 20 and close to the ohmic layer 14 is not fully depleted of free carriers (negative charges) and this deteriorates the dark decay while decreasing the ability of the coating to be quickly and fully discharged by light.

5. The coating is a high speed photoconductor.

The coating has a high quantum yield which, for most visible light is higher than unity. The following table indicates the speed of the coating compared with the speed of a selenium coating considered to be one of the best known at this time. The criterion is based upon the number of electrons which can be dissipated or discharged from the coating as a result of the absorption of a single photon.

| Radiation Wave Length | SeTe + As | CdS Coating 16 |
|---|---|---|
| 4600 Å (Blue) | .5 | 1.3 |
| 5400 Å (Green-Yellow) | .04 | .7 |
| 6200 Å (Red) | .0005 | .15 |

The coating which is identified as SeTe+As is a commercially available selenium telluride coating doped with arsenic. The CdS coating is one which has been deposited in accordance with the invention. The figures given above are for pure cadmium sulfide, undoped. In order to bring the red end of the visible spectrum up, small amounts of dopant can be added which give additional traps capable of providing additional electrons when the coating is charged. The values given for the coating of the invention when doped for example with small amounts of phosphine ($PH_3$) which provide phosphorous increase to 1.4, 1.15 and 0.6 respectively for the blue, green-yellow and red.

Other dopants which have provided gain increase in the red end of the spectrum are carbon, cobalt, iodine and copper.

Reference herein to dopant use presumes very small amounts of the order to 100 or so parts per million of the principal material.

The speed of the photoconductive coating is related to its ability to accept charge as well as its ability to discharge. Comment on charging will be made below, but at this point it is important to indicate that rapid charging and discharge can be achieved in nanoseconds which is not known for electrostatic coatings in the prior art. The utility of the coating can be extended to many fields outside of ordinary imaging for reproducing, copying and photographing.

The discharge which is mentioned above is not a discharge to a conductive member but is a recombining of electrons with positive energy states (immobile holes) to dissipate the original charge. This is believed to occur in the coating at levels which are produced in the bulk during the sputtering process which deposits the material. The explanation for the action of the coating is complex and involves its band gap, Fermi level, electron lifetime, transit time and other considerations.

A highly simplified explanation is that the field established by the charging is sustained during carrier travel.

The discharge not being to a conductive member, as in the case of the selenium drum, for example, the ohmic layer 14 of the electrophotographic member 10 is needed only for charging. It would be feasible to have a member without an ohmic layer and to bring a conductive plate or the like adjacent the coating when it is to be charged. Practical considerations dictate the construction of the electrophotographic member 10 as disclosed.

6. The coating is panchromatic.

Figure 8:
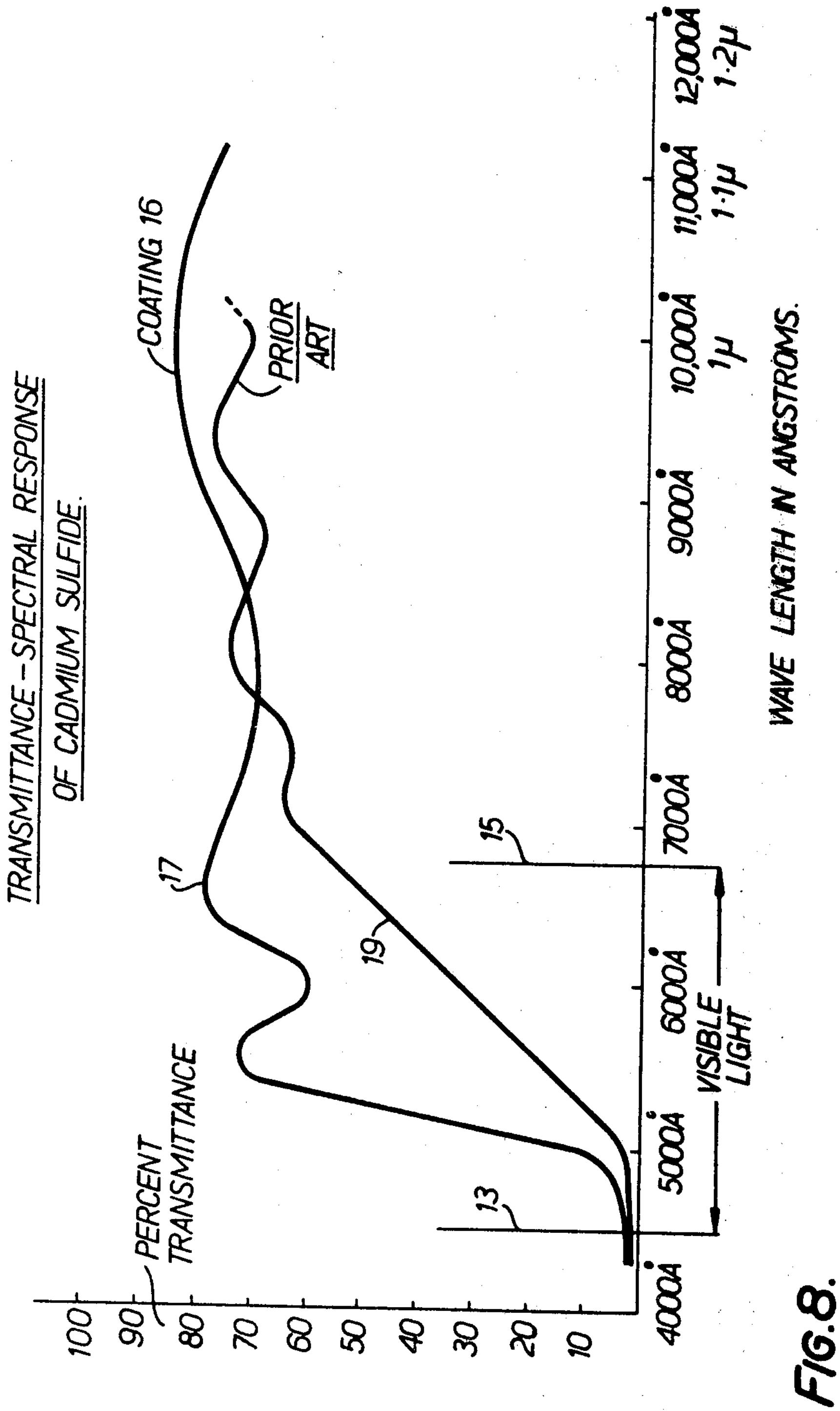
FIG. 8 is a graph showing the spectral response of the preferred coating of the invention compared with the prior art.

The coating has the ability to dissipate charge over a wide spectrum of radiant energy. The response is shown in the graph of FIG. 8 for a typical coating of cadmium sulfide sputtered according to the invention. Reference may also be made to the table above showing the response to specific frequencies. The frequency response is considered in terms of a charged coating that is caused to discharge by white light. As in the case with many electrophotographic members, the response falls off at the red end of the visible spectrum. Visible red radiation is absorbed very little, but by proper doping this end can be brought up quite dramatically.

The coating of the invention responds well to radiation outside of the visible spectrum also, such that it is sensitive to X-rays, gamma rays and the like.

The graph of FIG. 8 illustrates the spectral response versus transmittance of a prior art coating of cadmium sulfide not having the properties of the invention and a coating 16 which is in accordance with the invention. The axes of the graph are as indicated thereon, Angstroms vs. transmittance. The visible portion of the spectrum is marked by the lines 13 and 15. The curve 17 represents the response of a photoconductive coating of cadmium sulfide deposited in accordance with the invention and having a thickness measured by interferometric methods as 4120 Angstroms. The curve 19 is a prior art curve for a coating of cadmium sulfide resulting from deposite by conventional methods of sputtering assumed to be about 5000 Angstroms thick.

The transmittance of the cadmium sulfide coating of the invention is everywhere better than that of the prior art coating except for a small area in the vicinity of 8000 Angstroms which is outside of the visible range and is in the infra-red region. On this account the coating is not heat sensitive. The coating of the invention has a relatively flat response throughout all of the visible range while the same material of curve 19 has a distorted response, being high in the infra-red regions and low in the blue-green regions. The prior art coating 19 is heat-sensitive because of this. The red end of the visible spectrum can be brought up by doping the coating 16 with small amounts of carbon, cobalt, iodine, copper or phosphine, this also serving to increase the gain of other parts of the spectrum.

7. The coating is electrically anisotropic.

The expression "anisotropic" as used herein means that the resistivity of the coating is different in different directions. Below there is a table showing the resistivity of the coating for various conditions and in various directions. From this table it can be concluded that on its surface the coating has a high resisitivity which is of the order of $10^{20}$ ohms per square. Vertically the resistivity is of the order of $10^8$ ohm centimeters. As will be seen the effect of the surface resistivity dominates all other effects.

RESISTIVITY OF CADMIUM SULFIDE COATING USED IN ELECTROPHOTOGRAPHY

| LOCATION OF MEASUREMENT | IN LIGHT UNCHARGED | IN DARKNESS UNCHARGED | IN DARKNESS CHARGED | IMMEDIATELY UPON DISCHARGE |
|---|---|---|---|---|
| Laterally on the Surface | $10^{20}\Omega/\square$ | $10^{20}\Omega/\square$ | $10^{20}\Omega/\square$ (1) | |
| Laterally in the Bulk | $10^8$ ohm cms. | $10^{13}$ ohm cms. (2) | $10^{14}$ ohm cms. (3) | |
| Transversely through the Bulk | $10^6$ ohm cms. (4) | $10^{11}$ ohm cms. | $10^{14}$ ohm cms. | $10^8$ ohm cms. (5) |

(1) Theoretically deduced, verified by electron bombardment.
(2) Mathematical extrapolation.
(3) Mathematical extrapolation.
(4) After remaining in light for a long period.
(5) Carriers not drifted back from ohmic layer.

The above measurements, where feasible, were made in several ways. One method is by the classical method of laying down electrodes and passing a small current through the material, giving the lateral bulk measurements. Another method of measurement is to assume that the discharge of the coating acts in a manner of a capacitor and analyze the discharge in this fashion, fitting known capacitive discharge curves to the discharge curve of the material. Still another method is to bombard the coating in vacuum with a low power electron beam and measure the current through the coating.

Anisotropy prevents migration of charge so that the individual increments of surface retain their relative surface potential and precisely define the gradients of a latent image. There is no edge effect and no gradual blending of the light and dark portions of the latent untoned image with passage of time. The resolution of the developed image then becomes limited only by the size of the particles of the toner. The theoretical smallest increment is the size of a single crystallite, that is 700 to 800 Angstroms in diameter. No toner particles that small are believed to be commercially available at present.

8. The coating has advantageous charge and discharge characteristics.

As indicated previously the coating of the invention is intended primarily for use in the environment which is represented by electrophotographic members. The structure is detailed in connection with FIGS. 1 and 2. The coating 16 is to be charged uniformly and discharged selectively when exposed to an object when the purpose is to achieve a latent image. It should be kept in mind that in order to achieve the quality of results which are comparative to those expected from silver halide film a high degree of flexibility is necessary. The ability of the electrophotographic film of the invention provides infinite grey scale, natural renditions of contrast and image timbre, and does this for a wide variation of conditions of light. All of this is related to the charge and discharge characteristics of the coating. The gamma curve (density vs. exposure) is electrically adjustable.

In addition to its use in imaging, the coating is capable of being charged and discharged in nanoseconds so that it can be used for information storage and retrieval in a variety of different fields. In other words there is a sharp on/off switching ability free of fatigue which is not known in other photo-conductive coatings.

Figure 6:
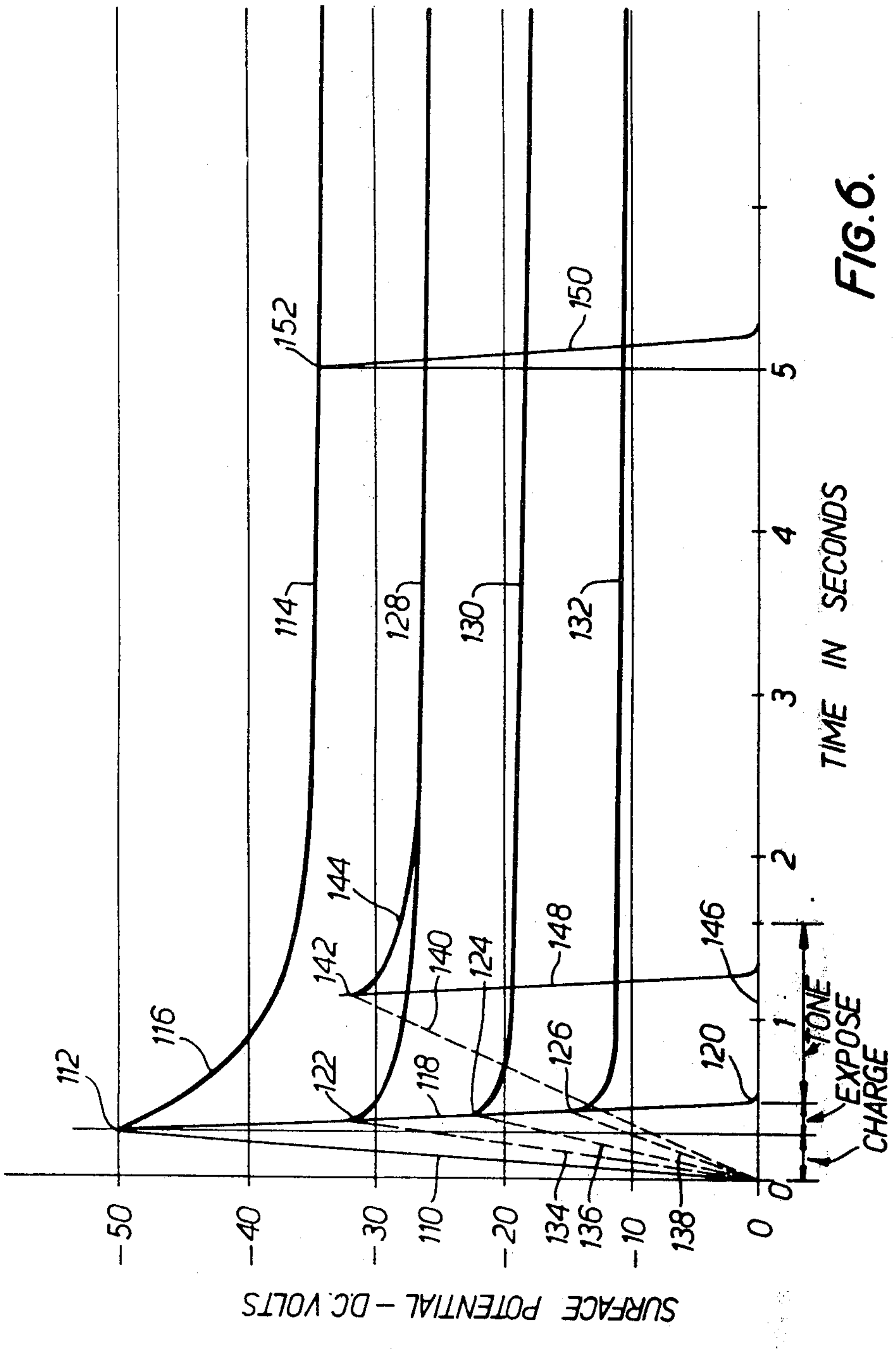
FIG. 6 is a graphic representation of the electrical characteristics of the coating of the invention showing the charge and discharge thereof.

Attention is invited to FIG. 6 which illustrates the charge and discharge characteristics of an electrophotographic film of the invention when used for imaging purposes. The scale of time is shown at the bottom in seconds which is a practical consideration in the case of imaging. Involved would be cameras, copying machines, and like apparatus that may have mechanisms that move or are moved physically and thus have limitations on the times that movements can be accomplished. As will be seen, the time limitation of the charge and discharge is not dictated by the coating of the invention which is capable of high speed charging and discharge.

The charge curve 110 for a given electrophotographic member having the coating of the invention is shown to be practically linear because the coating will accept charge as rapidly as it can be applied. The charge achieved is a function of the time of application and the corona current, that is, Q=TA or charge is the product of time and current, where Q is the charge in coulombs, T is the time in seconds and A is the current in amperes. This concept enables control of the surface potential.

In the case of conventional electrostatic techniques, the photoconductors are normally charged to saturation—as much charge leaks off as is applied—with uncontrolled corona and then exposed to a maximum amount of light to assure minimum residual voltage (maximum discharge) with the result that there are little or no intermediate voltages to assist in acquiring plural degrees of grey scale. As will be seen, the coating of the invention can be charged to any desired intermediate level. This can be done either by the variation of the time of the charging or the current of the corona or both.

In the case of the charge line 110 the coating has been charged to a maximum potential which is shown to be minus 50 volts d.c. on the surface in about 0.3 second. This is indicated at 112. Assuming a thickness of about 3500 Angstroms for the coating 16, this surface potential represents a charge acceptance of about 14.3 volts per thousand Angstroms. It has been found that in order to enable imaging and toning with good contrast and grey scale it is necessary that the charge of the coating be at least several volts per thousand Angstroms. Obviously, an acceptance of 14.3 volts per thousand Angstroms is excellent. For such an electrophotographic film there is considerable leeway for intermediate charge voltages which will provide excellent density gradation in the toned image since the toner can discern about 0.25 volt increments.

The degree of charge acceptance of the coating of the invention is much higher than any known electrophotographic members which are available commercially as well as most coatings reported in the literature. All cadmium sulfide coating deposits reported in the literature are known to be unable to accept any practical charge. Those which are chargeable accept charge at a fraction of that which the coating of the invention is capable of accepting.

The acceptance of charge of the coating is believed to be caused by the abrupt departure from periodicity and chemical changes in the surface layer. The deep traps or surface energy states in the barrier layer 20 enable the capture of electrons with many of their energy levels falling inside the forbidden band between valence and conductance. The charge is strongly knit because of the high surface resistivity and the independent field domain effect of the individual crystallites. Accordingly, there is little inter-domain effect between the charges and they remain in place irrespective of what happens to their neighbors. There is no edge effect when discharge occurs selectively. The charges before exposure are not easily dislodged. The bulk has upon charging of the surface been fully depleted of free carriers for thickness up to one micron and probably somewhat higher.

The curve 114 which is shown in FIG. 6 is the surface potential which results from the coating remaining in darkness after charge to the point 112. This is the dark decay curve, and as characteristic of condenser discharges it commences in a relatively steep portion at 116 and then flattens out. From the curve it can be seen that there is a substantial amount of charge after a considerable period of time. The coating of the invention will retain a substantial charge in darkness for many hours.

An example of dark decay testing was made on an electro-photographic member to measure the discharge thereof. The film was of a construction shown in FIG. 1. The substrate 12 was a polyester film a fraction of a millimeter thick, the ohmic layer 14 was primarily indium oxide 266 Angstroms thick and the coating 16 was pure cadmium sulfide 3687 Angstroms thick. The film was charged in darkness with corona that provided a current of −400 microamperes for 0.9 seconds and reached a surface potential of −33 volts. The decay in darkness (a complex RC discharge curve) had dropped to −20 volts in about 20 seconds, to −16.4 volts in 50 seconds, to −10 volts in 5 minutes, to −7.3 volts in 10 minutes. At about 12 minutes there was still −6.7 volts on the film, this being sufficient to image and tone with excellent grey scale if desired. At this point the film was suddenly discharged through a 4.5 neutral density filter, using a model 252 Vivitar flash unit. The surface voltage dropped to −2.5 volts which is still capable of being imaged and toned. At about 20 seconds later, the filter was removed and the film flashed again whereupon the surface discharged to zero.

The curve 118 represents the light decay curve of the coating from maximum charge, assuming that the film is exposed to bright light immediately that it has achieved its maximum charge. The discharge occurs immediately and proceeds fully to zero with no residual voltage remaining as indicated at 122. The elapsed time of discharge is shown as about 200 milliseconds.

The discharge of the coating by exposure to light is achieved when photons enter the coating, are absorbed and cause the recombination of holes and electrons. The coating of the invention can be discharged totally to zero surface potential because the depletion layer extends throughout the entire bulk for thin films of the order of 2 microns and less. Moreover, this discharge can be achieved in nanoseconds as will be described in connection with FIG. 7. The only limitation on the total time of a cycle including discharge is the practical problem of exposing the charged surface at high speed. In an imaging device this is required to be done by projection, as for example, in opening the shutter of a camera and then closing it.

The coating 16 below the barrier layer 20 is required to be depleted of free carriers upon charge. In other materials such as selenium, the electric field is never able to expel all free carriers. In the case of the invention the free carriers are electrons and for thicknesses up to about 2 microns all are expelled. Above that there will be some carriers remaining close to the ohmic layer. Certainly in the case of the preferred thin layer thickness of 2000 to about 7000 Angstroms, there is total depletion and when exposed to radiation discharge can occur all the way to zero.

In the case of projection of an object upon a charged coating for imaging purposes, the partial discharge of an increment of the coating will lower the voltage of the surface thereof at which point the displaced dark decay curve will commence and with a very sharp cutoff. Thus, in FIG. 6 partial discharge of the coating is indicated by three examples of increments not fully discharged, one resulting in the level of surface potential at 122, one at 124 and another at 126. The dark decay curves which follow these discharges are 128, 130 and 132, respectively. From these curves it can be seen that it is feasible to have an almost infinite grey scale in the latent image achieved when the coating is exposed because the dark decay discharge curves are almost parallel. Additionally, the total discharge of the coating carries fully to zero at 120. No known electrophotographic member has a capability of discharging immediately to zero. As a matter of fact, the amorphous selenium coating of xerographic apparatus in use today has a residual voltage which is of the same order as the total surface voltage of the coating of the invention when fully charged to its maximum potential.

To be clear concerning the ability of the coating of the invention to achieve an almost infinite grey scale, consider that Step No. 1 of FIG. 3 occurs in the time period marked "CHARGE", Step No. 2 occurs in the time period marked "EXPOSE" and Step No. 3 occurs in the time period marked "TONE". Since the toner will adhere in proportion to the surface voltage of the respective increments, there being no migration of charge between increments in the meantime (see item 7 above, "The coating is electrically anisotropic") each increment will follow a dark decay curve similar to those of 128, 130 and 132 always maintaining a proportional gradient between them and thus providing photographic grey tone quality but with better resolution than the normal silver halide film. The smoothness of the surface and the resulting perfect dots when toner is fused thereon is another factor of good image quality.

The slope of the dark decay curve for any increment of the coating of the invention varies slightly with the voltage to which the increment is charged. Thus, the dark decay curve 114 of FIG. 6 is readily seen to be steeper than the dark decay curve 132. This would follow logically from a consideration of the discharge characteristics of capacitors. The dark decay curves have less and less difference in their slopes as time passes so that the tendency is for these curves to approach a condition of equal slopes or parallelism. This characteristic enables the control of the gamma curve of the coating for different purposes of development. Charging an electrophotographic member to a high voltage and exposing it quickly enables one to achieve images which have a greater degree of variation available at the darker end of the grey scale than if the member were charged to a lower level and/or exposed at a later time. This provides a wide flexibility.

It has been found that for conditions of charge above about 10 volts the sensitivity of the electrophotographic film of the invention is substantially independent of the charge which has been applied to the coating. The incremental discharge voltage is proportional to the amount of exposure and establishes a specific dark decay curve upon cessation of the exposure. The amount of discharge is equal for all increments for any given intensity of light. The intermediate charge levels retain their proportional relationship over a very long period of time, certainly for minutes, and thus allow for reproduction of a toned image with complete fidelity and without grey scale distortion. The choice of the charge voltage, time of exposure and length of toning can be varied to provide great flexibility in the use of the invention for imaging purposes.

In FIG. 6, if desired, the user can charge the coating up to a lower voltage, say along the line to the point 122 where the light available is greater in the object to be imaged than in the case of charging to the point 112. Even if light conditions are low and it is desired to have the gamma curve less steep than in the case of the high charge conditions, charging along the line 134 will not result in the loss of grey scale but will require extending the toning time somewhat.

Other charging curves for lower maxima are shown at 136 and 138.

If desired, the time of charging may be increased, resulting in a charge along the line 140 which is discontinued at 142. The dark decay curve 144 for this point, being substantially at the same voltage as the point 122 would be identical to the curve 128 but displaced in time from that curve. Exposure would be effected as soon after the time 146 as practical and would result in a selective discharge along the line 148 with the several increments sharply turning into different dark decay curves depending upon the amount of light to which each was exposed. Toning would commence thereafter and continue for a period of time which depends upon the type of image desired and the voltages attained after exposure. The intermediate discharge curves for the conditions of charge represented by point 142 are not shown on the graph.

In FIG. 6 for indicating the characteristics of charge and discharge of the coating, it is assumed that the coating has been charged to maximum at 112 and is not exposed for a period of tiem but is kept in darkness until five seconds have elapsed. At this point, the charge on the surface of the coating has decayed to the point 152 which is still at a voltage of about 35 volts d.c. If exposed at this time, the maximum light discharge will occur along the line 150 to zero. If exposed to a variable light object, there is still a substantial grey scale that can be achieved through intermediate degrees of illumination which will cause an almost infinite number of different voltages to exist on the coating thereby still giving a good grey scale. Toning may have to be carried on for a slightly longer period of time than if the exposure took place earlier in time, but the quality of the resulting developed image will be as good.

Figure 7:
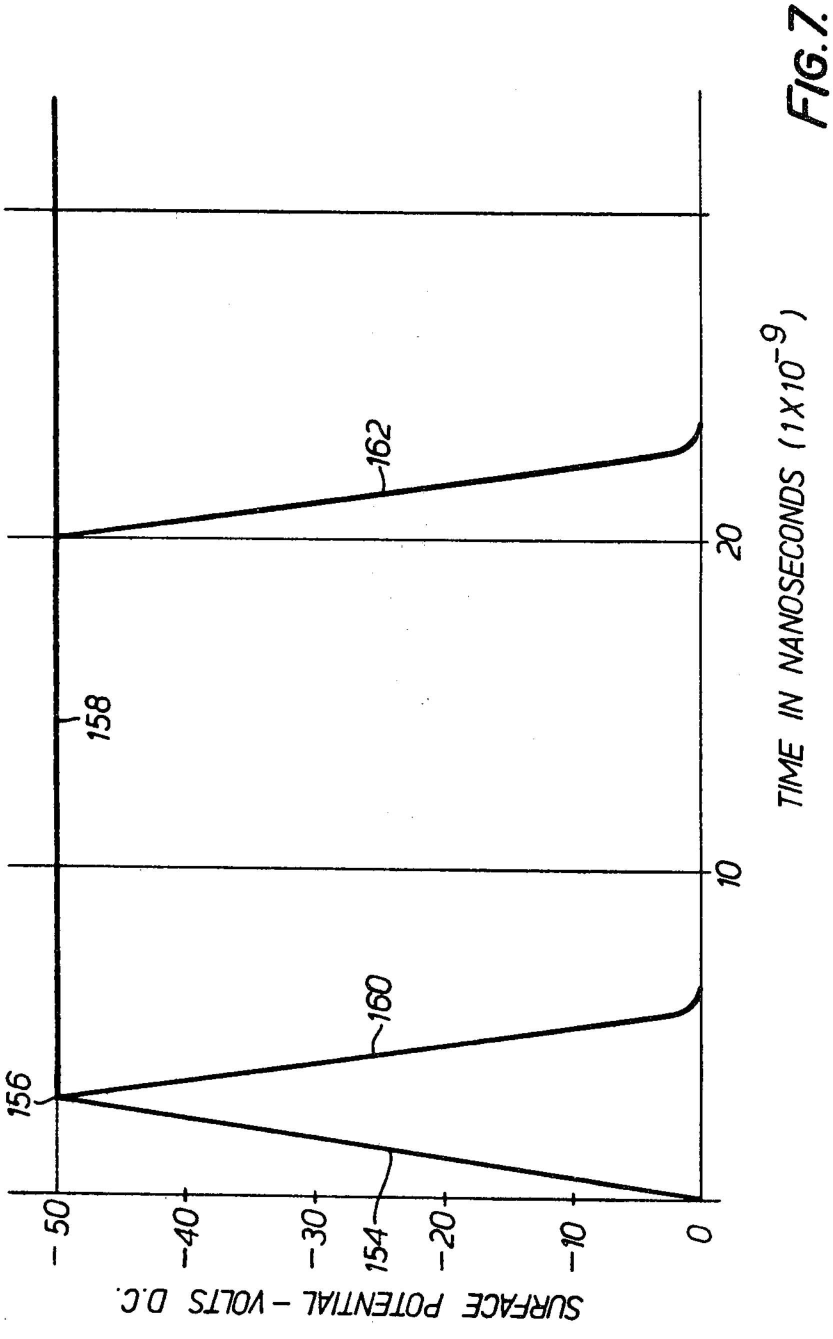
FIG. 7 is a graphic representation similar to that of FIG. 6 but on a different time scale.

In FIG. 7 the charge and discharge of the idential coating is shown, but on a different time scale. The horizontal axis is in nanoseconds. The coating of the invention can accept a charge rapidly along the line 154 to a voltage 156. This is shown occurring in about 3 nanoseconds. It is clear that if the coating is considered to be made up of a large number of storage increments or elements which are independent due to the anistropy of the coating, this charge represents a change of state of one storage increment. Furthermore, the intensity of the electron beam can establish a variable condition of charge and read a complete variegated scene onto a piece of electrophotgraphic film. That scene or the change of state of the respective increments will be stored for a period of time which depends upon the dark decay curve of the element at the charged voltage the increment can be as small as the tip of the individual crystallite.

In FIG. 7, the dark decay curve of the element charge is shown at 158, this being a gradual decay because of the time scale.

If the single increment which has been charged is immediately discharged, the discharge will occur in nanoseconds as well along the line 160 or with some delay, along the line 162. The ability of the coating to be charged and discharged at high speed with the addition of storage capability enables the electrophotographic member to be used for a wide variety of purposes.

9. The coating is flexible per se

The preferred form of the electrophotographic member 10 of the invention is as shown in FIGS. 1 and 2. In this configuration with the thicknesses as described, namely the coating 16 being less than two or so microns thick, the ohmic layer 14 being of the order of 400 Angstroms or so thick and the substrate 12 being a fraction of a millimeter thick, the entire member is highly flexible. It is capable of being enwrapped around a mandrel of a diameter of ¼ inch without cracking or crazing. This property is not easily conceived of as occurring in a member which has a coating that is crystalline since frangibility is always considered a property of crystals. The density of the crystals and the hardness of the surface thereof also seem inconsistent with the property of flexibility. The compression stress applied during sputtering is believed to account for the great strength, resilience and integrity of the coating enabling it to be readily flexed without damage.

The property of flexibility is not consequential to any manner of member which is based upon a substrate of glass or metal but even in such cases, the flexibility of the coating applied to such relatively rigid substrates enables the member to withstand vibration and bending without damage to the coating.

The property of flexibility for the preferred electrophotographic member 10 enables this member to be passed through processing machinery over rollers and around guides without danger of cracking or damage.

10. The coating has no fatigue or persistence.

Xerographic selenium drums cannot be used for long periods of time because they lose their photoconductivity. They must thus be replaced from time to time. In the case of the coating of the invention, there is no fatigue whatsoever. Tests made upon the coating by rapidly cycling the same through millions of cycles of charge and discharge have no effect upon the gain and other properties of the coating.

In some electrophotographic members, the discharge of the elements continues even after the radiation to which the member is exposed is discontinued. This distorts and fogs the resulting developed image. In the case of the coating of the invention, the instant that the radiation applied to any element is stopped, the discharge stops and the element immediately assumes its dark discharge curve. This sharp cutoff has been described above.

The above described ten properties are not exclusive but comprise the principal properties of the coating in use primarily as a part of an electrophotographic member such as detailed in connection with FIGS. 1 and 2. Many benefits and advantages not specifically mentioned flow from these properties. The theory of operation of the coating has to some extent been described in connection with the catalog of properties but additionally will be set forth hereinafter. Prior to discussing the theory it is deemed beneficial to mention the effects of varying the thickness of the coating as a way of explaining how the properties vary.

Figure 9:
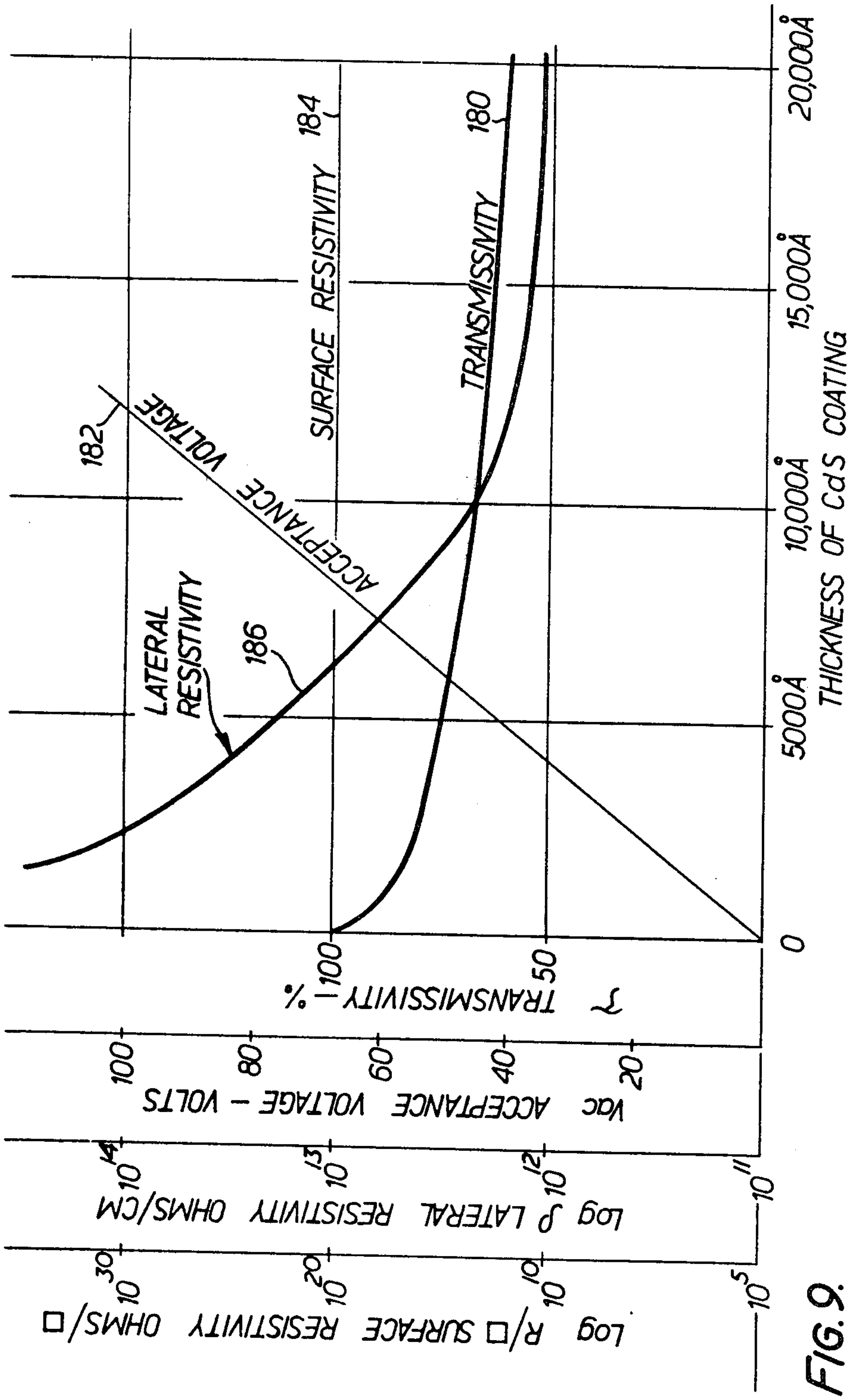
FIG. 9 is a chart showing the variations of certain properties of the coating of the invention with thickness of the coating.

FIG. 9 is a chart with a series of graphs showing how some of the properties of the coating vary with thickness of the coating. A study of this graph will assist in applying the invention to various types of uses.

The horizontal axis of the chart is in Angstroms thickness of the coating assumed to be deposited on the ohmic layer 14 and the substrate 12. The vertical axis is set up for four different parameters, these being $\tau$ transmissivity, $V_{ac}$ acceptance voltage, Log $\rho$ lateral resistivity in the bulk in charged condition in ohm centimeters and finally Log R/□ surface resistivity in ohms per square.

Considering first the graph 180 which is the variation of transmissivity with respect to thickness of the coating, it is logical that the thicker the coating the less light will be transmitted. When the coating thins to zero the transmission is complete at 100%. From the graph it can be noted that after the thickness exceeds one micron, i.e., 10,000 Angstroms, the transmissivity starts to drop below about 65%. Since exposure or achieving discharge requires the absorption of photons, unless light can get into and penetrate through the bulk of the coating the charge cannot be fully dissipated. The gain of the coating is controlled by the physical make-up of the material deposited and hence is constant regardless of the thickness, but is to no avail if the photons cannot get into the bulk to cause the combination of the holes and electrons. The best results have been obtained with transmissivity between about 70 and 85% and this occurs with thicknesses ranging from about 2000 Angstroms to about 6500 Angstroms. For thinner coatings it is not feasible to absorb enough photons to obtain sufficient combinations of holes and electrons for good imaging, but with prolonged exposure and long toning thin coatings of the order of 1000 can be used for copy work. Such coatings are not practical to achieve high speed imaging, high resolution, good grey scale and the like. Thicker coatings, say up to 2 or so microns have utility but not as great as those which are practically transparent.

The acceptance voltage of the coating is directly proportional to the thickness of the coating as indicated by the linear graph 182. The acceptance voltage graph slope is a function of the type of material used and its surface, bulk lateral and transverse lateral resistivities under conditions of charge and discharge. The graph shown is for the cadmium sulfide deposited in accordance with the invention, but there will be slight differences in different deposits which will vary the slope slightly. At a thickness of about 2500 Angstroms, the total voltage acceptance, which should be understood as the maximum, is about 30 volts. The voltage acceptance per thousand volts is about 12 volts which is excellent for good imaging. But for the other properties, any thickness of the coating would provide good imaging; however, the thinner coatings do not have sufficient absolute acceptance voltage to enable even a few volts to be applied by way of charge.

The surface resistivity 184 is shown as a straight line having a value of about $10^{20}$ ohms per square regardless of thickness of the coating. At the very thinnest of coatings, the surface resistivity value cannot be considered reliable because the measurements of resistivity, even if they could be made, would not likely be separable from bulk measurements due to the fact that at these thin dimensions the bulk of the coating 16, the ohmic layer 14 and the barrier layer 20 are very difficult to identify separably. Their respective contribution to any measurement is practically non-ascertainable. At thicknesses above a few hundred Angstroms the surface barrier comes into play as an independent element.

It should be appreciated that the practical effect of resistivity at a value of $10^{20}$ ohms per square approximates that of infinite resistivity. Variations which range below that value, say to $10^{17}$ ohms per square, will not materially decrease the effect of the surface barrier layer in maintaining the independence of charge of closely adjacent increments of area. In other words, the resistivity can be considered to range from about $10^{17}$ ohms per square to better than $10^{20}$ ohms per square with accompanying high resolution and absence of charge migration. This factor also prevents the edge effect which is inherent in photoconductors such as amorphous selenium by ensuring that the surface charges cannot migrate to zones of potential difference between adjacent charges and thus cannot produce intense field concentrations which attract more toner particles.

The surface resistivity does not change whether the coating 16 is charged or not, nor whether it is in darkness or light. Thus, the value remains the same irrespective of the thickness of the coating greater than about 1000 Angstroms. This establishes and maintains electrical anisotropy.

The property of lateral resistivity is shown by the graph 186 to increase with a decrease in thickness. The values here are those which exist in ohm centimeters when the coating is charged. Values of the order of $10^{14}$ ohm centimeters are achieved at thicknesses of about 2000 Angstroms. Notwithstanding the decrease is rather steep to about 10,000 Angstroms thickness, even at this last value the resistivity is well above $10^{12}$ ohm centimeters. The bulk of the coating achieves somewhat of a maximum value after the coating increases above 10,000 Angstroms and remains constant thereafter.

The values of resistivity transversely in the bulk are the same as lateral in the bulk when the coating is charged, but drop to about $10^{8}$ ohm centimeters when discharged due to the high gain of the coating. This decrease in transverse resistivity enables the high speed imaging of electrophotographic film using the coating and likewise provides properties ideal for other uses.

Reference has been made to "thin film" in this discussion. While there is a general definition of thin film as signifying a layer that does not have bulk properties throughout its extent, it would be appropriate to define thin film as meant in this specification. A thin film according to the invention is one in which the depletion layer extends throughout the entire thickness of the layer. This gives the properties desired. Thus, for a coating of cadmium sulfide as 16, when charged the depletion layer is throughout the entire coating up to about 1.5 to 2 microns, and will even be practically complete up to about 3 microns. In the case of a coating such as selenium where the coating is 25 microns thick, the depletion layer is a very small part of the bulk. The coating is definitely not a thin film. The preferred thickness of coating 16 for most uses is from about 2000 to 7000 Angstroms, and this is clearly a thin film as defined herein.

Referring once again to the method of applying the coating to a substrate such as the flexible polyester member 12, the technique has been described as R.F. sputtering. For the purpose of explaining in detail the manner in which the coating process is carried out, it will be described in connection with the deposit of cadmium sulfide on a previously deposited layer of indium/tin oxide.

At the time of start up of the sputtering apparatus 53, it is assumed that there is a large roll of the substrate S mounted at 56, threaded through the various rollers and around the drum 60 and secured onto the takeup roll 64. The vacuum pumps 102 are then started and the entire interior of the vessel 54 is pumped down to a suitable vacuum. After the vacuum has been established, the electric power may be applied, the coolant for cooling the cadmium sulfide targets 66 and 68 commenced to circulate, and the heat exchange liquid started circulating in the drum near its skin, the latter liquid comprising hot oil. The background gas is introduced from one or more sources 106 as a mixture of argon, hydrogen sulfide and oxygen in certain proportions and the parameters all adjusted as steady state is reached. The motors controlling the movement of the substrate have in the meantime been started so that the heated drum surface does not melt the substrate.

When steady state is reached, the apparatus 53 operates continuously until the entire roll of substrate has been coated. The conditions in the apparatus are maintained as closely as possible to steady throughout. After the entire roll has been coated, the apparatus is stopped, the power turned off, the gasses shut off and the chamber opened. The now fully wound roll 64 is removed and a fresh uncoated roll reinstalled at 56 and the process repeated.

The various conditions which are established and maintained in the apparatus 53 are as follows for a typical run:

1. Targets—These are sintered members 66 and 68 of ultra-pure cadmium sulfide cemented to stainless steel mountings which are water cooled. The purity is of the order of 99.9999998%. When doped, the dopant is either applied by means of gas, by painting minute amounts of solutions onto the cadmium sulfide target or by using other targets which have the dopant incorporated therein when made. The amounts of dopant used are very minute—on the order of less than hundreds of parts per million.

2. The pressures in the chamber, etc.—Initially the chamber is pumped down by mechanical, diffusion and/or cryogenic vacuum pumps to a relatively good vacuum. This degasses everything in the chamber and removes moisture to a high degree. A typical pump-down pressure will be between $10^{-6}$ and $10^{-7}$ torr. The argon gas which is used along with the hydrogen sulfide is admitted and maintained at a pressure of about 6 millitorr, the variation during sputtering being 5 to 9 millitorr. The gas percentage is 93.9% ultrapure argon and 6.1% ultrapure hydrogen sulfide. Oxygen is admitted simultaneously in very small amounts, say in hundreds or thousands of parts per million. Gases to provide doping are admitted in minute quantities, say parts per million and these can be phosphine for phosphorous doping and methane for carbon doping. Targets may have metal dopants incorporated.

3. The substrate—As mentioned, the basic substrate 12 is a polyester a fraction of a millimeter thick. It is preferred that the substrate be degassed and dehumidified before use by passing the length of substrate through a heating apparatus which heats to about 100° C. Other substrates can be aluminum, stainless steel, etc. under other conditions.

4. The energy—The R.F. supply 80 in a typical apparatus can provide about 20 KW of energy during the sputtering process. The r.m.s. voltage applied across the targets for a typical setup is about 1000 volts R.F. which self-rectifies by virtue of the plasma to achieve a half wave rectified peak d.c. voltage of about negative 1400 volts at the target, depending to some extent on the target material. The target temperature for cadmium sulfide will of course be a function of its voltage and the current which passes. This is mentioned below, but depending upon the nature of the target material, this temperature must be controlled to prevent literally explosive hot spots which are macroscopic and cause pitting and crazing of the target if not kept from spreading. Voltages on the target may run from about negative 1000 to 2000 volts for good sputtering conditions. The bias voltage on the anode is kept normally at negative 20 volts. It can be higher up to about negative 150 volts before removal of deposit becomes excessive.

5. Mechanical considerations—The transport mechanism in the chamber is arranged to maintain a fairly low tension with structures which sense the tension and respond to maintain it constant. It was originally believed that the plastic substrate would stretch because of softening, but it has been found that it actually shrinks in width and length both. This gives rise to the compression stress on the crystals which has been mentioned as providing strength and dimensional stability. The actual substrate tension can vary during the sputtering process because of slight changes in temperature, thickness of the substrate and other parameters. A typical tension is about 50 pounds or less.

6. Speed of deposit—With the arrangement of two targets which is specified below, the speed of deposit is typically 3 microns per hour. The entire deposit of the coating 16 is effected in a single pass of the substrate through the plasma 108 generated between the targets and the drum. Thus, the rate of deposit can be controlled by the speed of movement of the substrate which is in turn controlled by varying the speed of the transport mechanism. At the above mentioned speed of three microns per hour, a typical thickness of deposit of about 3000 Angstroms can be deposited by moving the substrate at a rate of about 14 to 15 millimeters per second past the targets. Increasing the size of the targets and their number can enable the same deposit to be made at speeds of the substrate much faster than 15 millimeters per second.

Thin coatings can be deposited in one pass by substantial increases of speed. For example, the bonding layer 18 is deposited at a speed of substrate which is much faster than for the normal deposit and at reduced power.

7. Temperatures—The target temperatures are quite high, being of the order of 350° C. The temperature of the polyester during deposit is about 165° C. The drum 60 is heated through the use of hot oil circulated in the drum 60, the latter being maintained at about 150° C. The ohmic layer is believed to generate substantial heat by eddy currents due to some of the RF which is present in the plasma in the apparatus. As a result, the substrate is quite soft while the sputtering is going on. The higher temperatures provide energy at the surface where the impinging molecules impact and are believed to promote stable and dense deposits. The ohmic layer is estimated as raising the temperature of the substrate about 15° C. above the temperature of the drum.

8. Geometry—The geometry of a typical installation will assist in understanding the nature of the apparatus 53 and the conditions of sputtering:
   - Drum diameter—40 cm (about 18 inches)
   - Width of substrate S—20 inches
   - Approximate dimensions of targets—22 by 10 inches
   - Gap between targets and drum—50 mm
   - Approximate radians of plasma 108—about $\pi/2$
   - Dark space at the target—about $\frac{1}{2}$ inch
   - Dark space at the anode—about $\frac{1}{4}$ inch.

9. Electric fields, etc.—The field between the cathode and anode constitutes the entire voltage on the cathode as measured below ground minus the bias, although this total voltage exists from the cathode (targets) to the shielding which is ground potential. The plasma 108 in the cap rectifies the R.F. voltage to D.C. voltage. The bombardment energy from the ionized gas results in substantial energy applied to the particles arriving at the substrate. This is estimated as 100 electron volts. Compared with the energy of particles deposited through the use of vapor techniques, this is well over ten times greater.

Mention has been made of the bias voltage that is applied to the anode during the sputtering in order to achieve the unusual properties of the coating 16. To review, the anode is maintained at a negative voltage which is a small fraction of the voltage of the cathode, which may be at negative 2000 volts d.c. The shielding around the target and unexposed parts of the anode are maintained at ground potential. This establishes a dark space just at the anode in addition to the normal dark space at the cathode, and the substrate has its outer surface engaged by the second dark space. This has been called the Langmuir sheath and has been known in so-called back-sputtering which has been used only for cleaning. So far as known, it has not been utilized for the purposes of achieving the desirable attributes described for the coating 16 of the invention. It has not been known for the making of an electrophotographic member.

Figure 10:
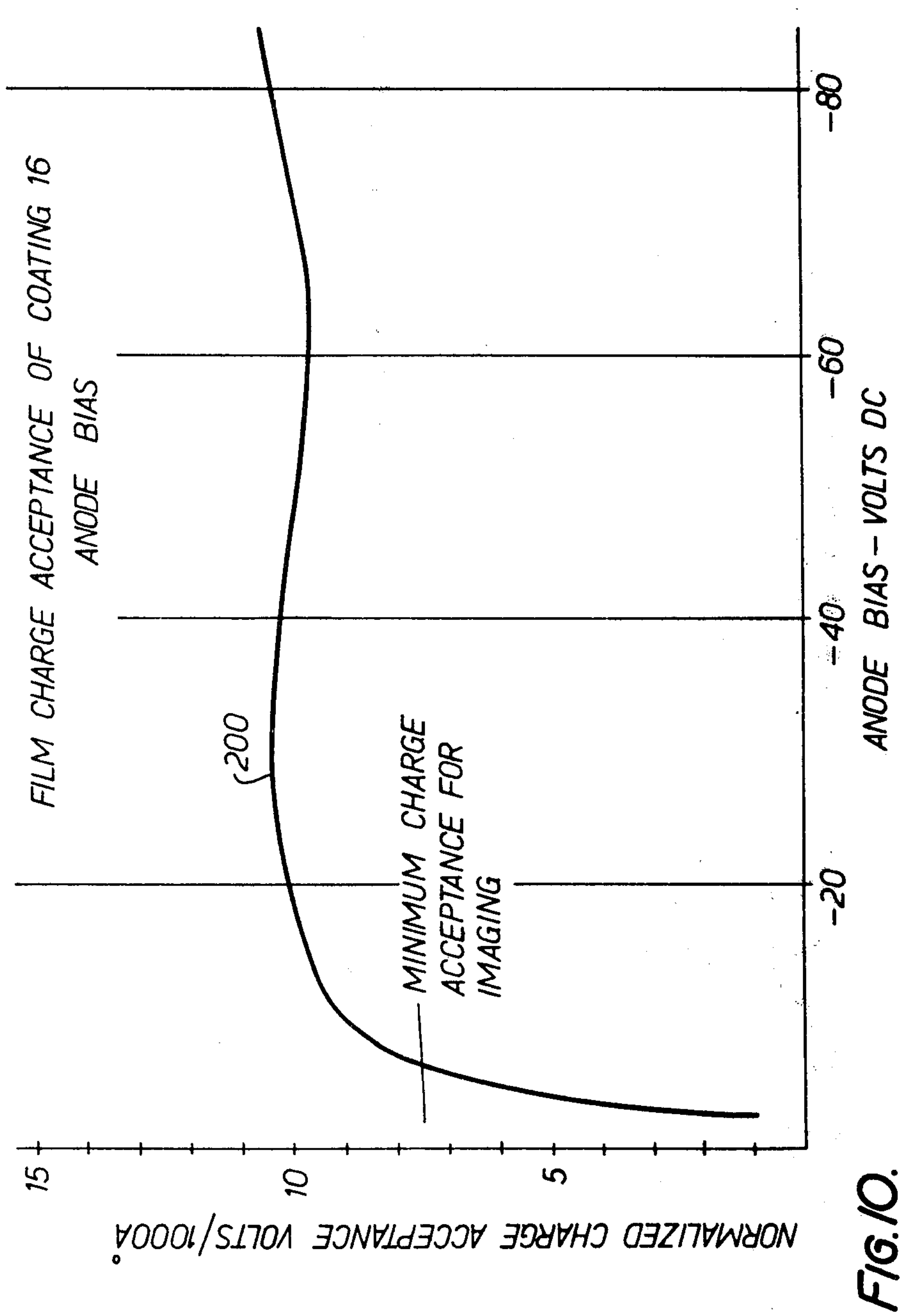
FIG. 10 is a graph showing the variation of charge acceptance voltage with variation in the bias voltage of the anode.

It has been determined that the amount of bias will to a certain extent control the charge acceptance of the resulting electrophotographic film having the coating sputtered with this bias. In FIG. 10 there is illustrated a graph as the results of some tests made to determine the charge acceptance of a coating of cadmium sulfide versus bias. Through experience it has been determined that for satisfactory imaging there should be a charge acceptance of about 7 volts per thousand Angstroms or better. From this fact it can be seen that until the graph reaches its level portion at 200 the results will be unsatisfactory. The rapidly changing portion of the graph at 202 means that one cannot be certain what the charge acceptance will be for lower values of bias. Starting at about negative ten volts the charge acceptance per thousand Angstroms reaches about 9 volts and remains fairly steady for biases up to higher values.

When biases of the order of negative 150 volts and greater are used, there is reverse sputtering of the cadmium sulfide from the substrate and the rate of deposit is decreased. A typical bias used is negative 20 volts. This bias provides an electric field that tends to orient the dipole-like CdS molecules as they impinge against the substrate so that the more reactive S atoms are outward.

The theory of operation of the coating 16 and its action while incorporated for example into an electrophotographic member revolves around its crystalline structure and its electrical configuration.

The deposit occurs in a condition of high electrical energy density and is believed to be the result of the bias applied, the use of the ultrapure targets and the proper mixture of background gases to assure the perfect stoichiometry, the R.F. power applied, the heating of the substrate and the field effect of the bias. The crystalline deposit resulting comes down with the sulfur atoms uppermost since they are deposited like dipoles. These become bonded to the oxygen introduced to give the barrier layer which is some form of complex oxide.

The heated substrate has its temperature enhanced by action of eddy currents in the ohmic layer so that when the molecules are impacted they do not necessarily remain static but still have some mobility and energy. The eddy currents are believed to be induced by the intense field provided by the second dark space. The arriving molecules seek and establish the most perfect and stable bonds to build the crystalline deposit. This is achieved in a highly ordered fashion and is made up of platelets. The morphology of the crystallites is almost perfect and oriented vertically, providing individual field domains that give high resolution in addition to the effects of the surface layer, i.e., anisotropy. The uniformity of the deposited crystals is believed to extend to their lattice structure because the deposits act as single crystal configuration in response to diffraction measurements.

When charged, the charges are uniformly applied and are associated with the respective crystallites. The band gap is 2.4 electron volts. The charging of the surface produces excess negative charges. Band gap energy photons of light produce electrons and holes in the bulk and they move to combine with opposite sign charges under the electric field which leads to reduction of the surface charge. The transit time of the carriers is less than the lifetime; thus, the field in the coating is sustained during carrier travel during exposure.

From the above specification and tests which have been made, a picture emerges of the nature of the coating 16 and its operation when charged and discharged. This picture points the way to other compounds which can be sputtered in the same manner and achieve similar, if not the same, effects.

The compounds in addition to cadmium sulfide alone which have been tested and found to be acceptable for most imaging purposes are zinc sulfide, zinc telluride, mixtures of zinc and cadmium sulfide. When deposited as a coating these compounds will provide a good many, but not all, of the excellent properties of cadmium sulfide alone and are dielectric materials, as well. They, like cadmium sulfide, are N-type compounds whose band gaps, dielectric constants, Fermi levels, and many other aspects are quite similar. They differ from cadmium sulfide primarily in their speeds and spectral responses.

The following provides information about cadmium sulfide as deposited in accordance with the invention from which the nature of the compound used will be appreciated.

The charge acceptance and the electric field achieved by the cadmium sulfide coating is better than that of known photoconductive compounds, including the most commonly used commercial compounds such as zinc oxide and selenium. It is much better than any known cadmium sulfide deposit. The coating is applied as a thin film in the preferred structure, and has a specific physical structure: it has a uniform crystalline configuration, i.e. hexaonal; it has a uniform crystalline diameter and length in a given thickness of coating; it has a specific orientation comprising vertical relative to the substrate upon which deposited; its stoichiometry is near perfect; the upper layer is one in which the sulfur atoms are uppermost because of the orientation of the molecules during deposit thereby providing bonds for the capture of oxygen resulting in the thin barrier layer of practically infinite resistivity (in zinc telluride, the tellurium atoms are uppermost); the coating is laid down so uniformly that the same responds to diffraction testing as though it were a single crystal.

As stated above, the band gap of cadmium sulfide is 2.41 electron volts. The Fermi level of cadmium sulfide is 0.35 electron volts from the conduction band when charged and 0.7 electron volts from the conduction band when not charged. The dielectric constant of cadmium sulfide is about $8.6\times10^{-14}$. The depletion layer extends throughout the entire thickness of the coating up to thicknesses defined herein as operative. There is no positive charge mobility in the bulk of the coating. The electron lifetime is $10^{-3}$ seconds and the transit time is $10^{-10}$ seconds, that is, the latter is substantially shorter than electron lifetime. On this account the electric field is sustained during carrier travel and the gain of the coating is thus very high. As pointed out, a single photon generally produces more than one electron during the discharge.

The crystalline deposit is made up of small platelets which are not perfectly aligned although generally they are uniformly stacked. This provides a great many small irregularities for photon absorption and substantially improves; panchromatic response of the coating.

It is believed that there is a layered structure in the coating in which there is a quasi field inversion similar to that of an NPN semiconductor device. The coating acts as though there is an excess of electrons therein followed by an immediate presence of holes in the bulk. The depletion decreases toward the ohmic layer. Deep traps are established in the barrier layer during charge. There is a form of amplification when the photons of light are directed to the film.

A comment might be made about the response of the coating of the invention when compared with other coatings such as for example, silver halide emulsions. The energy of a given exposure, i.e., the photon energy multiplied by the time of exposure in the coating of the invention is a constant. Thus, if the time is decreased, the energy needed to effect the same response is increased and vice versa. In silver emulsions, this law does not hold true in exposure below one microsecond. Emulsions cannot respond fast enough. The concept of inability to respond is called reciprocity failure and this does not occur in the coating of the invention down to one nanosecond. If the energy of exposure is increased, the time required for a given response is decreased to maintain the constant relationship.

Mixtures of zinc sulfide and cadmium sulfide have been deposited, using targets which had from 7½% to 100% of zinc sulfide with the remainder if any cadmium sulfide. Zinc sulfide has a larger energy gap in ultraviolet radiation and hence the greater the percentage of zinc oxide the more transparent the resulting coating, the greater its response to ultraviolet radiation and the less its response to the visible part of the spectrum. The smaller percentage of zinc sulfide coatings acted very much like the cadmium sulfide coatings but with slightly improved ultraviolet response.

It has been mentioned that oxygen is admitted in small amounts to help provide the barrier layer during deposit of the photoconductive coating. This presumes an effort has been made to remove oxygen from the chamber and the roll of substrate beforehand. The reason for this is to achieve uniformity in the resulting deposit. It has been found that there will normally be some occluded oxygen in rolls of substrate installed in the chamber even with substantial pumping down before coating. The preheating of the unwound roll just before placement in the chamber will decrease this amount substantially so that oxygen added will result in a volume that is more uniform. Oxygen addition gives better control.

While the theory of operation of the invention has been stated in some detail it is pointed out that the coating of the invention is operative as explained irrespective of the theory. The purpose of stating theory is to assist in a possible understanding of the invention, not by way of limitation.

Those skilled in the art will understand the manner of practicing the invention from the description and discussion above. The coating and the electrophotographic member made with the coating are the principal structures of the invention along with the method of depositing the coating. No limitations are intended on the use of the coating in other applications so long as the scope of the invention encompasses the same as defined in the appended claims.

What is desired to secure by Letters Patent of the United States is:

1. In a method of depositing a wholly inorganic dielectric photoconductive coating onto a substrate in which there is a pressure vessel having therein target means comprising at least one target of the material to be deposited, a supply of substrate, an anode in the vessel, means for leading the substrate to pass over and in engagement with the anode during the sputtering process, an external source of radio frequency energy having electrical couplings to the anode, target means and shielding arranged in the vicinity of the anode and target means, a supply of background gas including an inert ionizable gas and a second gas having at least one constituent for preventing disassociation of the compound during sputtering, means for establishing and maintaining a stable condition of sputtering plasma in the vessel between the target means and the anode, the steps of:

A. permitting a minute quantity of oxygen to be present in the vessel during the sputtering in an amount sufficient to form a barrier layer on the surface of the sputtered coating which includes oxygen in a combined form;

B. coupling the external radio frequency energy source to the target means and the shielding so as to establish a high negative potential at the target means and ground potential at the shielding;

C. coupling the anode with respect to the external radio frequency energy source and ground to provide a bias potential at the anode of about negative ten to negative 100 volts to produce a second dark space at the anode in addition to the usual first dark space at the cathode, the dark spaces being respectively on opposite sides of the sputtering plasma during sputtering;

D. leading the substrate over and in engagement with the anode and at a location relative to the second dark space so that the said second dark space is between the sputtering plasma and substrate; and E. introducing the background gas during the sputtering and permit the minute quantities of oxygen in the vessel to react with the surface of the sputtering in lieu thereof permitting the minute quantities of oxygen in the vessel to react with the surface of the sputtered coating to form a barrier layer thereon including oxygen in a combined form having a thickness of the order of 50 to 75 Angstrom units.

2. The method as claimed in claim 1 in which the supply of substrate is treated prior to introduction into the vessel to remove occluded oxygen and minute measured quantities of oxygen are introduced with the background gas during sputtering.

3. The method as claimed in claim 1 in which the target material is cadmium sulfide and the second gas is hydrogen sulfide.

4. The method as claimed in claim 1 in which the target material is zinc sulfide and the second gas is hydrogen sulfide.

5. The method as claimed in claim 1 in which the target material is cadmium sulfide and zinc sulfide as a mixture and the second gas is hydrogen sulfide.

6. The method as claimed in claim 1 and the step of heating the anode to a temperature of about 150° Celsius during the sputtering.

7. In a method of depositing a wholly inorganic dielectric photoconductive coating onto a substrate in which there is a provided a pressure vessel having therein target means comprising at least one target of the material to be deposited, there is provided a supply of substrate, there is an anode disposed in the vessel, means are provided for leading the substrate to pass over and in engagement with the anode during the sputtering process, there is an external source of radio frequency energy having electrical couplings to the anode, target means and to shielding arranged in the vicinity of the anode and target means, there is provided a supply of background gas including an inert ionizable gas and a second gas having at least one constituent for preventing disassociation of the compound during sputtering, there are provided means for establishing and maintaining a stable condition of sputtering plasma in the vessel between the target means and the anode, the steps of:

A. coupling the external radio frequency energy source to the target means and the shielding so as to establish a high negative potential at the target means and ground potential at the shielding;

B. arranging the anode electrically with respect to the external radio frequency energy source to provide a bias potential at the anode of about negative ten to negative 100 volts to produce a second dark space at the anode in addition to the usual first dark space at the cathode, the dark spaces being respectively on opposite sides of the sputtering pasma during sputtering;

C. leading the substrate over and in engagement with the anode and at a location relative to the second dark space so that the said second dark space is between the sputtering plasma and substrate;

D. providing temperature conditions during the sputtering at the anode to aid in the sputtering;

E. permitting minute quantities of oxygen to be present in the vessel in an amount sufficient to form a barrier layer on the surface of the sputtered coating which includes oxygen in a combined form.

F. introducing the background gas during the sputtering and

G. permitting the minute quantities of oxygen remaining in the vessel to react with the outer surface of the sputtered coating to form a barrier layer thereon including oxygen in a combined form having a thickness of the order of 50 to 75 Angstrom units.

8. The method as claimed in claim 7 in which the supply of substate is treated prior to introduction into the vessel to remove occluded oxygen and the minute measured quantities of oxygen comprise measured quantities introduced with the background gas during the sputtering.

9. The method as claimed in claim 7 in which the target material is cadmium sulfide and the second gas is hydrogen sulfide.

10. The method as claimed in claim 7 in which the target material is zinc sulfide and the second gas is hydrogen sulfide.

11. The method as claimed in claim 7 in which the target material is cadmium sulfide and zinc sulfide as a mixture and the second gas is hydrogen sulfide.

12. A method of making an electrophotographic member formed of a photoconductive coating on a substrate, the photoconductive coating being formed of a wholly inorganic dielectric compound which is microcrystalline of hexagonal, orderly, closely packed, highly uniform crystals having a crystal diameter less than 0.1 micron and a height equal to the thickness of the coating, the crystals all being arranged substantially vertically oriented relative to the plane of the substrate, the coating capable of accepting a charge of electrons at speeds of nanoseconds as well as at substantially slower speeds, such charge providing surface potential of the order of 10 volts per thousand Angstroms coating thickness, having a dark decay characteristic of surface potential versus time that drops off immediately after charging at a generally logarithmic rate, but with the rate of decay decreasing with time such that there remains substantially more than ten percent of the original maximum surface potential after several minutes with an absolute value sufficient to tone an image with an excellent grey scale, said member capable of being selectively discharged after being charged, by means of said radiation in any increment of area capable of being distinguished as finely as electronically from an immediately adjacent increment, said discharge occurring proportionally to the degree of radiation intensity to which said increment is subjected, the member being capable of total discharge, the increment assuming immediately after said discharge a decay characteristic of surface potential versus time which maintains proportionality of the said characteristics of all other increments of said member for a substantial period of time during which said increment can continue to be distinguished from all others, said method comprising the steps of (A) providing a conductive planar substrate, (B) depositing the photconductive coating in the form of a film of one of cadmium sulfide, a mixture of cadmium sulfide and zinc sulfide, zinc telluride and zinc sulfide on said conductive planar substrate by RF sputtering, and (c) forming a barrier layer including oxygen in a combined form on the exposed surface of said film, said barrier layer having a thickness of the order of less than 0.01 micron and a lateral surface resistivity of the order of $10^{20}$ ohms per square.

13. The method according to claim 12 wherein the film is deposited by RF sputtering in a pressure vessel in an atmosphere which includes minute-measured quantities of oxygen.

14. The method according to claim 13 wherein said barrier layer is formed on the exposed surface as a result of the oxygen in the pressure vessel.

15. The method according to claim 12 wherein the RF sputtering is carried out non- reactively.

* * * * *